(12) United States Patent
Katayama et al.

(10) Patent No.: US 8,295,227 B2
(45) Date of Patent: Oct. 23, 2012

(54) RADIO COMMUNICATION SYSTEM, MOBILE STATION, AND RADIO BASE STATION

(75) Inventors: Rintaro Katayama, Kokubunji (JP); Toshiyuki Saito, Mountain View, CA (US); Shiro Mazawa, Fujisawa (JP); Daigo Takayanagi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 921 days.

(21) Appl. No.: 12/051,262

(22) Filed: Mar. 19, 2008

(65) Prior Publication Data

US 2009/0016265 A1  Jan. 15, 2009

(30) Foreign Application Priority Data

Jul. 13, 2007 (JP) ................................ 2007-184029
Nov. 30, 2007 (JP) ................................ 2007-310168

(51) Int. Cl.
*H04W 4/00* (2009.01)
*H04K 1/10* (2006.01)
(52) U.S. Cl. ........................................ 370/328; 375/260
(58) Field of Classification Search ................... 370/328
See application file for complete search history.

(56) References Cited

U.S. PATENT DOCUMENTS

| 7,408,913 | B2 | 8/2008 | Khan | |
|---|---|---|---|---|
| 2005/0018610 | A1* | 1/2005 | Kim et al. | 370/236 |
| 2006/0195767 | A1* | 8/2006 | Ihm et al. | 714/776 |
| 2006/0251015 | A1* | 11/2006 | Khan | 370/329 |
| 2007/0047485 | A1* | 3/2007 | Gorokhov et al. | 370/329 |
| 2007/0064669 | A1* | 3/2007 | Classon et al. | 370/347 |
| 2007/0223404 | A1* | 9/2007 | Khan et al. | 370/278 |
| 2007/0254662 | A1* | 11/2007 | Khan et al. | 455/436 |
| 2008/0187136 | A1* | 8/2008 | Zhang et al. | 380/270 |

FOREIGN PATENT DOCUMENTS

JP  2004-343754 A  12/2004

OTHER PUBLICATIONS

"IEEE 802.20 Working Group on Mobile Broadband Wireless Access" Jan. 2006.
"Joint Proposal for 3GPP2 Physical Layer for Fdd Spectra" Jul. 2006.
3GPP TR 25.814 V7.0.0 (Jun. 2006).
Li Yuping, "Research on the HARQ techniques in IEEE 802.16e systems", Database of Excellent Masters' Complete Theses Published in China: Collection of Information Science Technology Theses, Feb. 28, 2007, with English Abstract.

* cited by examiner

*Primary Examiner* — Derrick Ferris
*Assistant Examiner* — Majid Esmaeilian
(74) *Attorney, Agent, or Firm* — Mattingly & Malur, PC

(57) ABSTRACT

A radio communication system of an HARQ method that makes an HARQ transmission interval of subpackets appropriate and reduces data transmission delay resulting from subpacket retransmission. In the radio communication system in which a packet is transmitted and receives with the HARQ method between a base station and multiple radio mobile stations, each of the base station and the multiple radio mobile stations has: a packet transmission circuit for transmitting subpackets in predetermined intervals; a packet reception circuit for repeating decoding processing by combining a newly received subpacket and a previously received former subpacket until an original packet is successfully decoded; and a HARQ control equipped with a function of, for packet communication whose data length is short, transmitting a subpacket or response from the packet transmission circuit in an HARQ transmission interval that is shortened from the HARQ transmission interval of the normal mode.

14 Claims, 19 Drawing Sheets

| INTERLACE NUMBER | FRAME NUMBER | | | | | | | | | |
|---|---|---|---|---|---|---|---|---|---|---|
| | F0 | F1 | F2 | F3 | F4 | F5 | F6 | F7 | F8 | F9 | F10 |
| 0 | P0 ↓ | | ACK/NAK ↑ | | P1 ↓ | | ACK/NAK ↑ | | P2 ↓ | | ACK/NAK ↑ |
| 1 | | P3 ↓ | | | | | ACK/NAK ↑ | | | P0 ↓ | |
| 2 | | | P2 ↓ | | | | | ACK/NAK ↑ | | | P3 ↓ |
| 3 | | | | P0 ↓ | | | | | ACK/NAK ↑ | | |
| 4 | | | | | − | | | | | − | |
| 5 | | | | | | P1 ↓ | | | | | ACK/NAK ↑ |
| ⋮ | | | | | | | | | | | |

FIG. 7

| INTERLACE NUMBER | F0 | F1 | F2 | F3 | F4 | F5 | F6 | F7 | F8 | F9 | F10 |
|---|---|---|---|---|---|---|---|---|---|---|---|
| 0 | P0 → | | ACK NAK ← | | P1 → | | ACK NAK ← | | P2 → | | ACK NAK ← |
| 1 | | P3 → | | | | | ACK NAK ← | | | P0 → | |
| 2 | | | P2 → | P0 → | | | | ACK NAK ← | | | P3 → |
| 3 | | | | | | | | | ACK NAK ← | | |
| 4 | | | | | — | | | | | — | |
| 5 | | | | | | P1 → | | | | | ACK NAK ← |
| ... | | | | | | | | | | | |

51 (INTERLACE NUMBER column)    52 (FRAME NUMBER row)

RADIO COMMUNICATION SYSTEM, MOBILE STATION, AND RADIO BASE STATION

CLAIM OF PRIORITY

The present application claims priority from Japanese application JP 2007-184029 filed on Jul. 13, 2007, and JP 2007-310168 filed on Nov. 30, 2007, the contents of which are hereby incorporated by reference into this application.

FIELD OF THE INVENTION

The present invention relates to a radio communication system, and more specifically to a radio communication system for cellular communication that adopts Hybrid Automatic Repeat Request (HARQ), and a radio mobile station (MS) and a base station (BS) that are applied thereto.

BACKGROUND OF THE INVENTION

In the fourth generation mobile communication system, HARQ attracts attention as a data retransmission method. In HARQ, in order to develop tolerance in a radio propagation path, a packet composed of transmitted data and error correcting bits (parity bits) generated by turbo encoding is divided into multiple subpackets for radio communication and are transmitted and received on a subpacket-by-subpacket basis. Usually, data is transmitted in the first subpacket and parity bits are transmitted in the subsequent subpacket. After transmitting a subpacket, a data transmission node waits a response from the data reception node and determines a subpacket to be transmitted next. If a received subpacket is successfully decoded, the data reception node sends back an ACK (Acknowledgement) to the data transmission node; if decoding fails, the data reception node sends back an NAK (Negative Acknowledgement). At this time, the data reception node buffers the received subpacket that was unsuccessfully decoded, and waits to receive the subsequent subpacket.

Upon reception of the NAK from the data reception node for the first subpacket, the data transmission node transmits the second subpacket. When the data reception node receives the second subpacket, it tries to decode the received data by combining the first and the second subpacket. That is, the data reception node tries to decode a data part of the first subpacket already received by using error correcting bits (parity bits) that were received in the second subpacket. The data reception node sends back an ACK or NAK to the data transmission node according to a decoding result.

When the data transmission node received the NAK from the data reception node as a response to the second subpacket, it transmits a third subpacket. In the case where the error correcting bits (parity bits) are divided in multiple subpackets, a remaining part of the error correcting bits is transmitted in the third subpacket. In this case, the data reception node that received the third subpacket tries to decode the received data by combining the first, the second, and the third subpacket.

The data transmission node of an HARQ method is equipped with a repetition function to retransmit an already transmitted packet when receiving a NAK for the last subpacket. Therefore, upon reception of a NAK for the last subpacket, the data transmission node retransmits a subpacket group that has already been transmitted, starting from the first subpacket, sequentially and waits for ACK to be transmitted from the data reception node. In this description, transmission of a subpacket that the data transmission node conducts upon reception of a NAK is called retransmission regardless whether the subpacket is new or has already been transmitted.

Upon reception of an ACK from the data reception node, the data transmission node determines that the packet is successfully transmitted, and transmits a new data packet that should be transmitted next to the data reception node in the above-mentioned subpacket form. When send back of a NAK from the data reception node was repeated and the number of retransmission of the subpacket reaches a previously determined limit value, the data transmission node stops a retransmission operation of subpacket. In this case, it means that packet transmission failed; the higher layer of the data reception node determines a repeat request for the packet, or discard of the received packet, or the like.

The HARQ method in which a transmitted packet including parity bits is configured to be transmitted after being divided into several subpackets enables the received data to be successfully restored before all the parity bits are received, provided that a radio channel state is good, and consequently makes possible a data communication that effectively uses radio resources. In HARQ, a dedicated channel for transmitting ACK/NAK information is prepared in a physical layer, for example, a channel group that includes a certain number of subcarriers of OFDM (Orthogonal Frequency Division Multiplexing), so that the speed of a subpacket retransmission control described above is enhanced.

A radio system using HARQ is proposed, for example, by IEEE802.20 that is a standardization organization, which defines a data retransmission control system by IEEE C802.20-06/04 7.1.3.1.2H-ARQ interlace structure. 3GPP that is a standardization organization is proposing a radio system using HARQ as LTE (Long Term Evolution), and defines a data retransmission control system in the above-mentioned radio system by 3GPP TR 25.814 V7.0.0 (2006-06) 7.1.2.3 HARQ, 9.1.2.5 HARQ. Moreover, 3GPP2 that is a standardization organization proposes a radio system of OFDMA (Orthogonal Frequency Division Multiple Access) using HARQ as LBC (Loosely Backwards Compatible), and defines a data repeat control method in the above-mentioned radio system by 3GPP2 C30-20060731-040R4. 1.3.4 Timeline.

SUMMARY OF THE INVENTION

For example, in LBC (Loosely Backwards Compatible) of 3GPP2, a unit of time period called a "frame" is defined in the radio section. A transmission interval of subpackets from the data reception node to the data reception node and a response timing of ACK/NAK from the data reception node to the data transmission node are specified using the frame as a unit. For example, in the case of a communication mode where a subpacket is transmitted from the base station in an eight frame period, each radio mobile station is configured to process the received subpacket in a four frame period on the base of the frame in which the subpacket is received and respond ACK/NAK to the data transmission node in the fifth frame. The base station finishes the processing of the ACK/NAK and transmission preparation of a subsequent frame in the subsequent two frame period and transmits the subsequent frame in the eighth frame.

The base station communicates with multiple mobile stations in a time division multiplexing manner by transmitting a subpacket in a different frame for each mobile station. In a communication mode where subpackets are transmitted in the eight frame period, the base station can communicate with eight mobile stations in the same data channel. A combination of frames with a fixed interval that is intended to assign a different communication opportunity for each mobile station is called interlace. The base station controls communication with the each mobile station based on an interlace number. In LBC, in addition to a communication mode of eight interlaces, for example, system configurations of a six interlace mode and a five interlace mode are being examined. However, the interlace mode can be set uniquely by the system.

In HARQ, the HARQ transmission interval of a subpacket is determined, for example, by a necessary duration that the data reception node requires for demodulation processing and decoding processing of the received data, and a necessary duration that the data transmission node requires for decoding processing of the received ACK/NAK, scheduling of data transmission, encoding processing of the transmitted data, etc. In the case of the eight interlaces described above, as data-processing times, a four-frame period is secured by the data reception node, and a two-frame period is secured by the data transmission node. Although data processing time changes according to the size of the subpacket transmitted and received, in the example of LBC described above, an HARQ transmission interval of the subpacket is determined so that the nodes of the data transmission side and the data reception side can secure sufficient processing times, respectively, even when a subpacket of a maximum size is transmitted in each frame period.

However, if the HARQ transmission interval is set so as to match the subpacket of a maximum size, when a subpacket of a small size that requires a short processing time is received, there is a problem that an idle time occurs until transmission of the next subpacket, which enlarges a data transmission delay. For example, in the VoIP (Voice over IP) service where a voice call is performed through an IP (Internet Protocol) network, a requirement of data delay is stringent compared with the best effort service, such as FTP (File Transfer Protocol). Since the VoIP packet has a comparatively small packet size, if the packet is transmitted and received in an HARQ transmission interval conforming with a processing time required by the maximum packet, a latency time more than required will be caused. Because of this, if the number of times of the retransmission of the subpacket increases due to a deteriorated radio environment, the data transmission delay may increase and a quality of service may degrade.

The object of the present invention is to provide a radio communication system in which the data transmission delay arising from the subpacket retransmission is lessened by making an HARQ transmission interval of the subpacket appropriate.

In order to attain the object, the radio communication system of the present invention is characterized in that the base station and the radio mobile station device each have an HARQ control function of, for data communication whose packet size is less than or equal to a constant value, performing the subpacket retransmission in an interval shorter than a standard interval.

Describing the system in detail, the present invention is a radio communication system for transmitting and receiving a packet by a hybrid automatic repeat request (HARQ) system between the base station and the multiple radio mobile stations any one of which has: a radio transmission and reception circuit; a subpacket transmission circuit for dividing a packet added with parity bits into multiple subpackets and outputting each of the subpackets to the radio transmission and reception circuit in a predetermined interval; a packet reception circuit for, when receiving a subpacket from the radio transmission and reception circuit, repeating decoding processing by combining a newly received subpacket and an already received former subpacket until an original packet is successfully decoded; and a control that, if the packet is successfully decoded by the reception circuit, generates an ACK as an response to the received subpacket and, if the packet is unsuccessfully decoded, generates a NAK and sends back the response through the packet transmission circuit at predetermined timing; and is characterized in that the control that each of the base station and at least one of the radio mobile stations has is equipped with a function of, in packet communication with a short data length, transmitting a subpacket or response from the packet transmission circuit in an HARQ transmission interval that is shortened from the HARQ transmission interval of the standard mode.

In the radio communication system of the present invention, the packet transmission circuit is composed of an Orthogonal Frequency Division Multiplexing (OFDM) type transmission circuit that forms a channel for subpacket transmission and a channel for response transmission with the subcarrier group whose subcarriers are different in frequency, and the packet reception circuit is composed of an OFDM type reception circuit, for example.

The control mode in which the HARQ transmission interval is shortened is applied to, for example, voice packet communication of VoIP. When performing HARQ control in the low latency mode, the base station and the mobile station conduct negotiation of shortening the HARQ transmission interval in advance of the data transmission.

If the size of the received packet is small, the data reception node can process decoding of the received packet in a short time, and can send back an ACK/NAK response in timing earlier than the ACK/NAK transmission timing (frame). If the transmitted data is small, parity bits that are added thereto also become short. Therefore, the size of the second and the third subpacket subsequent to the first subpacket containing transmitted data can be small. Accordingly, the data transmission node can bring forward the transmission timing of the subsequent subpacket, when it receives an NAK from the data reception node.

In the conventional HARQ radio communication system, the base station is assigning a different frame on a mobile station-by-mobile station basis and transmits/receives a subpacket and the ACK/NAK response. However, in the radio communication system of the present invention, a frame in which a mobile station working in the low latency mode transmits the ACK/NAK response and a frame (time period) in which another mobile station working in the normal mode transmits the ACK/NAK response may overlap. One feature of the radio communication system of the present invention is that the base station and the each mobile station are each equipped with a function of multiplexing multiple ACK/NAK's that are different in an HARQ control mode on the ACK/NAK transmission channel.

According to the present invention, since the radio communication system is configured so as to be able to shorten an HARQ transmission interval of the subpacket in the packet transmission where the packet length is less than or equal to a predetermined value, it becomes possible to transmit data of a real time system, such as of VoIP, with a reduced transmission delay and thereby to prevent degradation of communication quality.

BRIEF DESCRIPTION OF THE DRAWINGS

FIG. 2A, FIG. 2B, FIG. 2C, FIG. 2D, AND FIG. 2E are diagrams schematically explaining a data send action of an HARQ method; in which FIG. 2A shows data D that can be transmitted in one frame period, FIG. 2B shows a data packet added with parity bits, FIG. 2C shows the same data packet repeatedly transmitted, FIG. 2D shows subpackets transmitted in radio section, and FIG. 2E shows a subpacket transmitted in a four frame period;

FIG. 3A, FIG. 3B, FIG. 3C, FIG. 3D, FIG. 3E AND FIG. 3F are diagrams sequentially showing change of the amount of information that is applied to data decoding processing of the HARQ method; in which FIG. 3A shows a state where the data D was received by the first subpacket P0, FIGS. 3B and 3C show the data reception node receiving a parity bit continuing to the data D by subpackets P1, P2, and trying to decode the received data by combining the parity bits and data, and FIGS. 3D to 3F show repetition enabling the data reception node to sequentially receive subpackets P3 to P5 having the same contents as the already received subpacket group P0 to P2 and trying to decode the received data D using synthesized packets;

FIG. 7 is a diagram showing a relation between interlace number 51 and frame number 52 in the case where the HARQ transmission control is performed in a control mode in which an HARQ transmission interval of a subpacket is shortened;

DETAILED DESCRIPTION OF THE PREFERRED EMBODIMENTS

Hereafter, as an embodiment of the present invention, a cellular radio communication system of an OFDM (Orthogonal Frequency Division Multiplexing) method equipped with an HARQ control function of the present invention will be described with reference to drawings.

Figure 1:
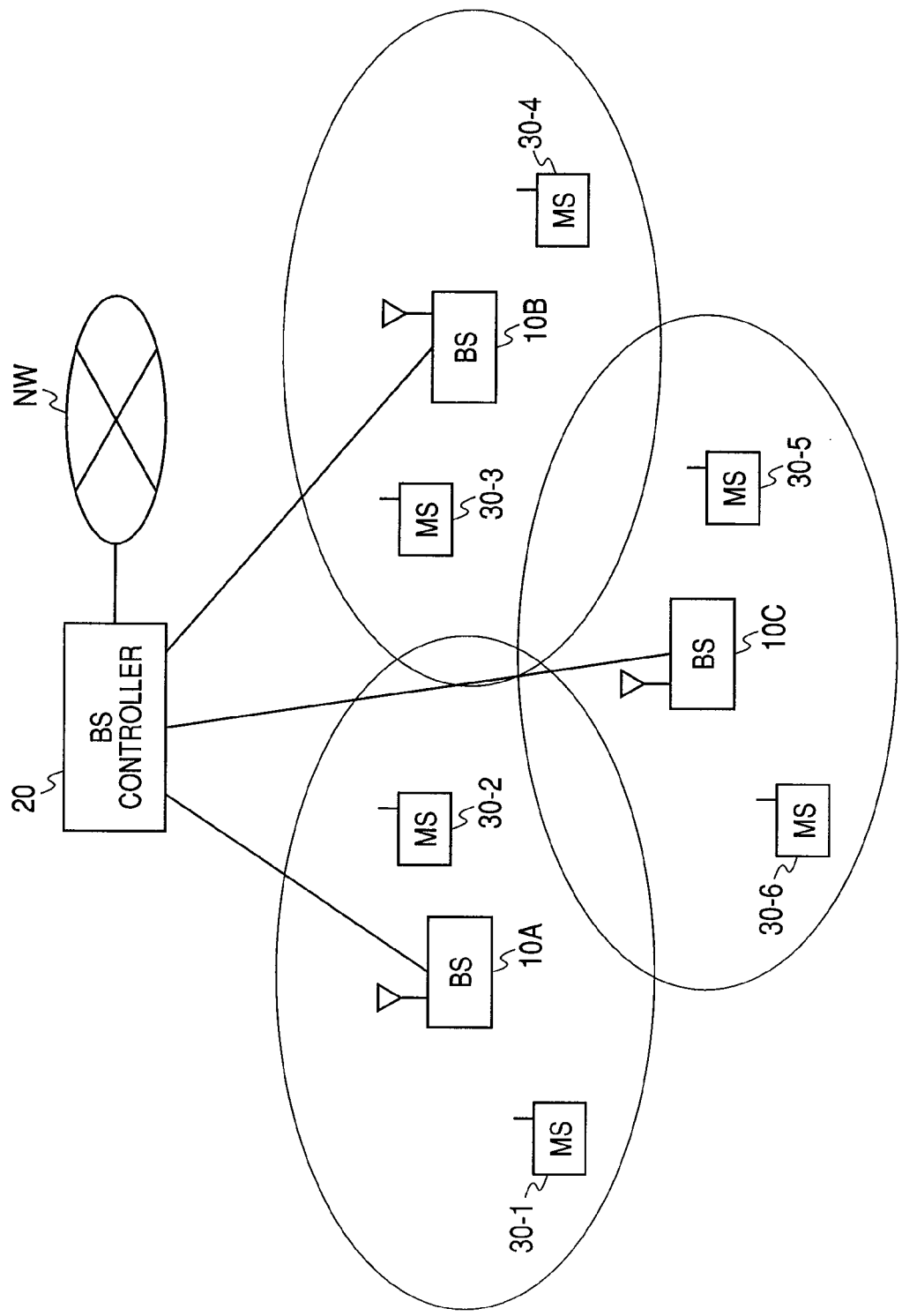
FIG. 1 is a diagram showing a cellular radio communication system to which the present invention is applied.

Generally, the cellular radio communication system is constructed with multiple base stations 10 (10A to 10C), multiple radio mobile station devices 30 (30-1 to 30-6), and BS controls 20 connected to these base stations 10 by wire circuits, as shown in FIG. 1. The BS control 20 is connected to a network NW. The network NW is composed of a public telephone network and the Internet network, to which other mobile station devices that can serve as communication partners of the radio mobile station device (hereinafter, referred to as only the mobile station) 30, various kinds of information providing servers, a call mobile station server, etc. are connected. However, the network NW may be constructed by a LAN. The each mobile station 30 is connected to the base station device 10 by radio, and can communicate with other devices connected to the network NW through the base station device 10 and the BS control 20.

FIGS. 2A to 2E are diagrams for schematically explaining data send actions in the data transmission node of the HARQ (Hybrid Automatic Repeat Request) method.

FIG. 2A shows data D that can be transmitted in one frame period. The data D is added with parity bits RB for error correction generated from the data D by encoding of, for example, a turbo code etc., becoming a data packet as shown in FIG. 2B. Virtually, although each data packet contains a header showing information of a destination address, a transmission source address, etc., here, in order to simplify the drawings and explanations, the header part is treated as a part of the data D and is omitted from the drawings.

In HARQ, as shown in FIG. 2C, transmission of the same data packet is repeated several times (repetition). FIG. 2D shows subpackets transmitted between the radio zones. Here, shown is a state where each data packet shown in FIG. 2C is divided into three and subpackets P0 to P5 having a predetermined format of the radio interval are generated. The subpackets P0 to P5 are transmitted in a predetermined interval sequentially from the first subpacket, as shown in FIG. 2E. FIG. 2E shows that a subpacket is transmitted in the four frame period from the data transmission node when there is an NAK response to the transmitted subpacket from the data reception node.

FIGS. 3A to 3F are diagrams showing sequentially the change of the amount of information applied to the next time data decoding processing when decoding of the received data failed in the data reception node of the HARQ method.

FIG. 3A shows a state where the data D was received by the first subpacket P0.

In the normal ARQ, when the data reception node failed in receiving the data D, it informs a higher layer of it, and the higher layer makes a repeat request for the data D to the data transmission node. On the other hand, in the data reception node of the HARQ, when reception of the data D failed, the data reception processor (physical layer to MAC layer) sends back a NAK to the data transmission node, and conducts the followings, as shown in FIGS. 3B and 3C. It receives a parity bit continuing to the data D by subpackets P1, P2, and tries to decode the received data by combining the parity bits and data (and parity bit) extracted from the already received subpacket P0 (Incremental Redundancy).

As in FIG. 3C, if the data D could not be decoded even when all the parity bits RB are received, repetition enables the data reception node to sequentially receive subpackets P3 to P5 having the same contents as the already received subpacket group P0 to P2 and to try to decode the received data D using synthesized packets as shown in FIGS. 3D to 3F (Chase Combining). Therefore, it becomes possible to increase a power of the received code equivalently and make a success ratio of data decoding high.

Figure 4:
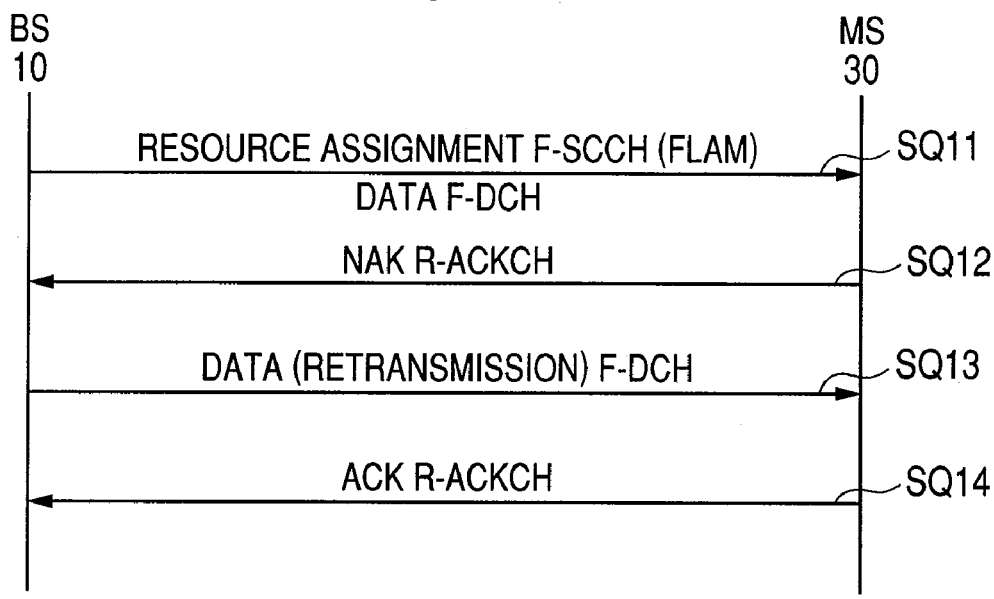
FIG. 4 is a diagram showing one example of a communication sequence of HARQ transmission control in a forward link heading for a mobile station (MS) 30 from a base station 10.

FIG. 4 shows one example of a communication sequence of the HARQ control in the forward link heading for the mobile station 30 from the base station 10.

In LBC, since the data transmission is performed by the OFDMA, it is necessary to specify a block of subcarriers of the OFDMA used for the data transmission, i.e., a frequency resource, for the mobile station 30. For this reason, when transmitting the first subpacket to the mobile station 30 in a Forward Link Data Channel (F-DCH), the base station 10 specifies a frequency resource for a F-DCH using a Forward Link Assignment Message (FLAM) transmitted in a Forward Link Shared Control Channel (F-SCCH) (SQ11). Incidentally, in LBC, there are specified a Non-sticky Assignment mode (or Non-persistent Assignment mode) that changes a frequency resource on a packet-by-packet basis and a Sticky Assignment mode (or Persistent Assignment mode) that does not change a frequency resource until failures in the packet transmission reaches a fixed count.

The mobile station 30 having received the first subpacket sends back an ACK to the base station 10 when the received subpacket is successfully decoded into the data D, and sends back a NAK when it is unsuccessfully decoded (SQ12). The response message ACK/NAK is transmitted to the base station 10 through the Reverse link Acknowledgement Channel (R-ACKCH).

SQ12 in FIG. 4 shows a case where the mobile station 30 failed to decode the received data and sends back the NAK. The base station 10 that received the NAK transmits the second subpacket to the F-DCH in a predetermined frame that is determined by the interlace number associated with the mobile station 30 (SQ13). The mobile station 30 that received the second subpacket combines the first and the second subpacket, and tries to decode the received data D. When the data is successfully decoded in this stage, the mobile station 30 sends back the ACK to the base station 10 through the R-ACKCH (SQ14). When decoding of the data is failed, the mobile station 30 sends back the NAK to the base station 10 through the R-ACKCH, and the base station 10 will retransmit a third subpacket.

Upon reception of the ACK from the mobile station 30, the base station 10 completes the retransmission control for one transmitted packet. Incidentally, when sending back of the NAK from the mobile station is repeated and the number of times of the subpacket retransmission reaches a previously determined limited value for the same data packet, the base station 10 halts the retransmission of the subpacket. In this case, the transmission of the data packet comes to a failure and the mobile station 30 performs a communication procedure, such as discard of the packet that have been received and a repeat request for the packet to the packet sender, according to a decision of the higher layer.

Figure 5:
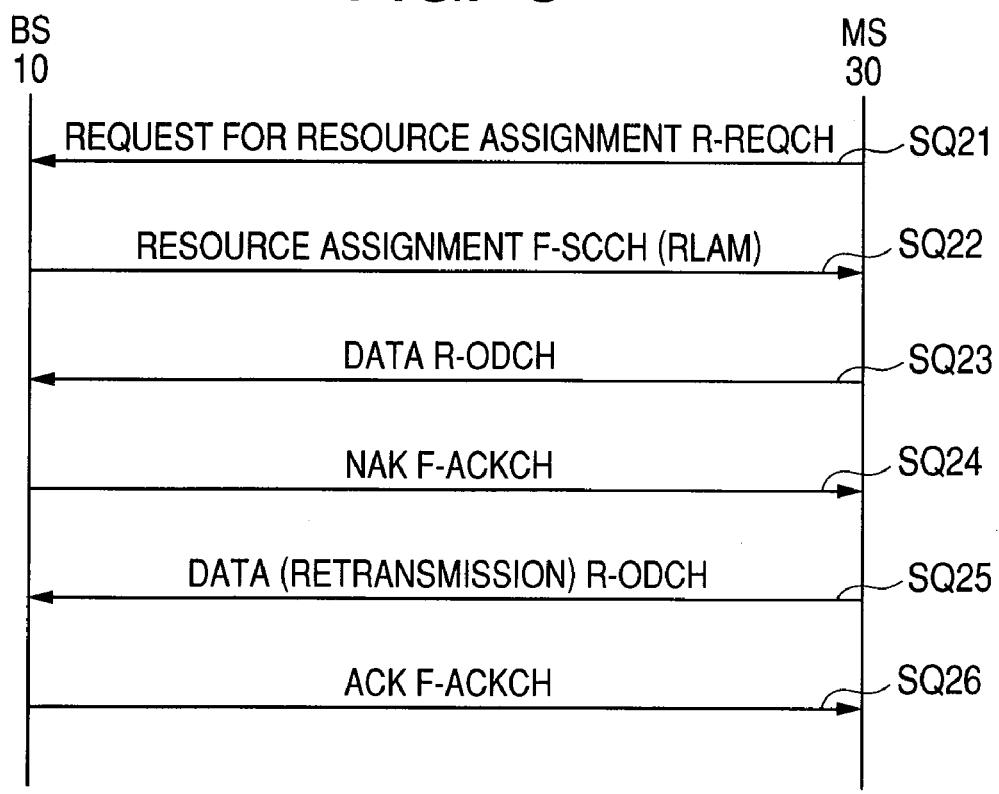
FIG. 5 is a diagram showing one example of the communication sequence of the HARQ transmission control in a reverse link heading for the base station 10 from the mobile station 30.

FIG. 5 shows one example of a communication sequence of the HARQ control in the reverse link heading for the base station 10 from the mobile station 30.

In LBC, the base station 10 specifies a frequency resource (subcarrier of OFDM) of the reverse link that the mobile station 30 uses for the data transmission. Therefore, the mobile station 30 that has a data packet to be transmitted requests resource assignment to the base station 10 through a Reverse Link Request Channel (R-REQCH) (SQ21). Upon reception of the request for resource assignment from the mobile station 30, the base station 10 informs the requesting mobile station 30 of a frequency source in the reverse link that the mobile station 30 should use, using a Reverse Link Assignment Message (RLAM) transmitted in the F-SCCH (SQ22).

Upon reception of the RLAM, the mobile station 30 divides a transmitted packet that is added with parity bits by encoding into multiple subpackets, and transmits the first subpacket using a frequency resource specified by the base station 10 through a Reverse Link OFDMA Data Channel (R-ODCH). The base station 10 decodes the first subpacket received from the mobile station 30. If the subpacket is successfully decoded, it sends back the ACK, and if decoding of the subpacket is failed, sends back the NAK to the mobile station 30. The response message indicating the ACK/NAK is transmitted to the mobile station through a Forward Link Acknowledgement Channel (F-ACKCH). SQ24 of FIG. 5 shows a case where the base station 10 failed to decode the received data in the first subpacket and sends back the NAK to the mobile station 30.

The mobile station 30 that received the NAK transmits the second subpacket to the base station 10 through the R-ODCH (SQ25). In the illustrated example, the base station 10 successfully combines the first and the second subpacket, succeeds in decoding the received data, and sends back the ACK to the mobile station (SQ26). Upon reception of the ACK from the base station 10, the mobile station 30 completes the packet transmission.

Incidentally, when the sending back of the NAK from the base station 10 is repeated and the number of times of the subpacket retransmission reaches previously determined limited value, the mobile station 30 halts the retransmission of the subpacket. In this case, transmission of the data packet becomes a failure, and the base station 10 performs a communication procedure of discarding of the packet heretofore received, or a repeat request for the same packet to the mobile station 30, or the like by a decision of a layer higher in rank than the physical layer and the MAC layer.

Figure 6:
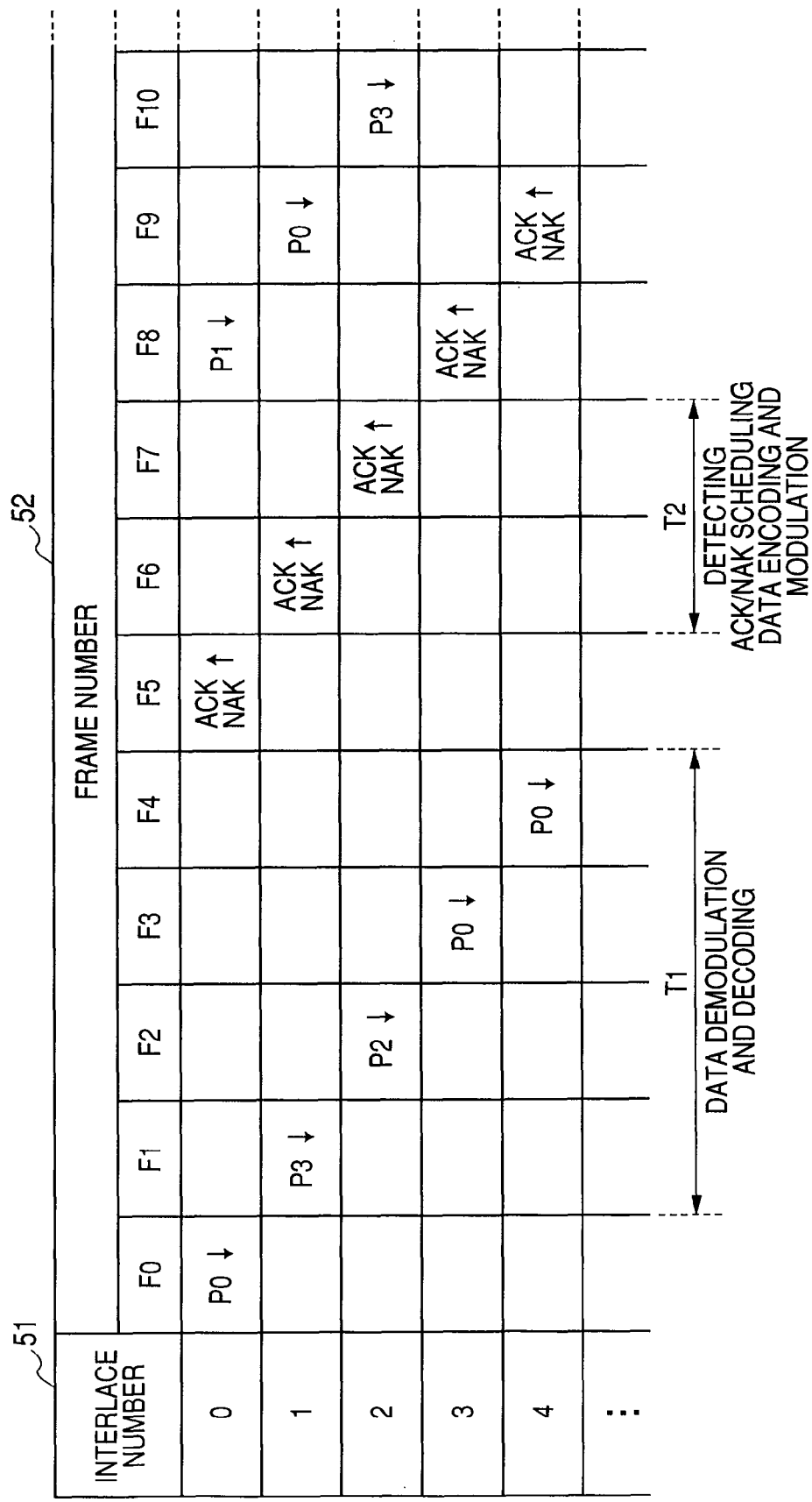
FIG. 6 is a diagram showing a relation between an interlace number 51 and a frame number 52 in the HARQ transmission control in LBC.

FIG. 6 shows a relation between an interlace number 51 and frame number 52 used for the data transmission and ACK/NAK transmission in the HARQ transmission control of LBC. Here, as one example of the conventional technology, the HARQ control such that the interlace structure is fixed to eight interlace one in which the subpacket is always transmitted in the eight frame period between the base station 10 and the mobile station will be explained. In FIG. 6, symbols F0, F1, F2, . . . shown in a column of frame number 52 represent frames that become transmission time periods of the respective subpackets and ACK/NAK's along a time axis.

For example, when the base station 10 transmits a subpacket in the frames Fi (I=1, 2, 3, . . . ) to the mobile station 30-*j* that is associated with the interlace numbers j (j=0 to 8), the mobile station 30-*j* completes demodulation processing and decoding processing of the received data D in a four frame interval T1 of frame Fi+1 to flame Fi+4 and sends back a response message (ACK/NAK) indicating whether decoding result is success in the flame Fi+5 to the base station 10. In FIG. 6, for example, with interlace number 0, the first subpacket P0 is transmitted in the frame F0 and the ACK/NAK response is sent back in the frame F5.

The base station 10 completes the decoding processing of the ACK/NAK, encoding processing of the transmitted data, and scheduling in a two frame period T2 of the frames Fi+6 to Fi+7. When the NAK is received, the subsequent subpacket is retransmitted to the mobile station 30-*j* in the frame Fi+8. With interlace number 0, the second subpacket is transmitted in the frame F8.

Regarding also the second subpacket, as in the case of the first subpacket, the ACK/NAK is sent back in the fifth frame from the frame F8 as an origin and retransmits a subsequent subpacket in the eighth frame.

Conventionally, the HARQ control of the fixed frame period described above is being performed in both of the forward link heading for the mobile station 30 from the base station 10 and the reverse link heading for the base station 10 from the each mobile station 30.

FIG. 7 shows, as one embodiment of the present invention, with the eight frame period being set to a standard control mode, a relation between interlace number 51 and frame number 52 in the case where the subpacket retransmission control of HARQ is performed in a control mode in which the HARQ transmission interval of a subpacket is shortened to the four frame period in a specific interlace.

In the case where the length of a packet transmitted in the radio interval is short like a voice data packet transmitted by VoIP, the data processing time T1 necessary in the data reception node can be smaller. Therefore, it becomes advantageous to perform the retransmission control in a control mode in which the subpacket HARQ transmission interval is shortened than that of the normal control mode in order to reduce the data transmission delay.

In the illustrated example, the control mode in which the subpacket HARQ transmission interval is shortened to the four frame period is applied to data communication of interlace number 0. If the subpacket size is small, the decoding processing by the data reception node can be completed in a short time, and accordingly it can advance response timing of the ACK/NAK than in the normal mode. Then, when the data reception node operates in the control mode in which the HARQ transmission interval is shortened receives the first subpacket P0 in the frame F0, it completes the demodulation processing and the decoding processing of the received data in a period of frame F0 and frame F1, and sends back the response message (ACK/NAK) in frame F2.

The data transmission node of a subpacket processes the response message in a period of frame F2 and frame F3, and when the response message is NAK, transmits a subpacket P1 in the subsequent frame F4. In the same time schedule of the subpacket P0, a response message is also sent back for the subpacket P1, and the HARQ transmission control of the four frame period is repeated until the received data is successfully decoded in the data reception node.

When the base station 10 transmits data to a specific mobile station 30-*j* with the subpacket HARQ transmission interval shortened, the base station 10 and the mobile station 30-*j* conduct negotiation therebetween for shortening the HARQ transmission interval prior to the data transmission, and acknowledge that the low latency mode will be applied to the packet transmission and sending back a response. It is also the same as when performing the data transmission in the reverse link from the mobile station to the base station.

The retransmission control mode applied to communication can be specified by either of the mobile station and the base station in a communication procedure of communication parameters performed between the base station and the mobile station prior to the communication, for example, in a call set-up procedure. It may be configured that shortening of the HARQ transmission interval is specified by a resource assignment request from the mobile station shown in FIG. 5. Moreover, when the packet communication such that the subpacket size becomes less than or equal to a predetermined value in the radio interval is performed, both the base station and the mobile station may be each equipped with an automatic setting function of the retransmission control mode in advance so that the control mode in which the subpacket HARQ transmission interval is shortened is automatically selected.

Although the subpacket transmission control of the eight frame period was designated as the normal mode and the subpacket transmission control of the four frame period was designated as the low latency mode in FIG. 7, each radio communication system can determine arbitrarily the subpacket HARQ transmission interval to be adopted as the low latency mode.

The base station determines a frequency resource for data transmission, and informs the mobile station of it by the FLAM transmitted in the F-SCCH explained in FIG. 4 and FIG. 5. In the Non-sticky Assignment mode (Non-persistent Assignment mode), when the base station transmits the first subpacket in each packet transmission, it informs the mobile station of the frequency resource by the FLAM. In the Sticky Assignment mode (Persistent Assignment mode), when the base station repeats packet transmission multiple times using a specific frequency resource specified by the mobile station as long as the number of failures in the packet transmission does not reach a predetermined value. Therefore, in the case of the Non-sticky Assignment mode, switching of the retransmission control mode on a packet-by-packet basis becomes possible by specifying the HARQ transmission interval (or retransmission control mode) of a subpacket in a specific field in the FLAM transmitted from the base station to the mobile station.

Figure 8:
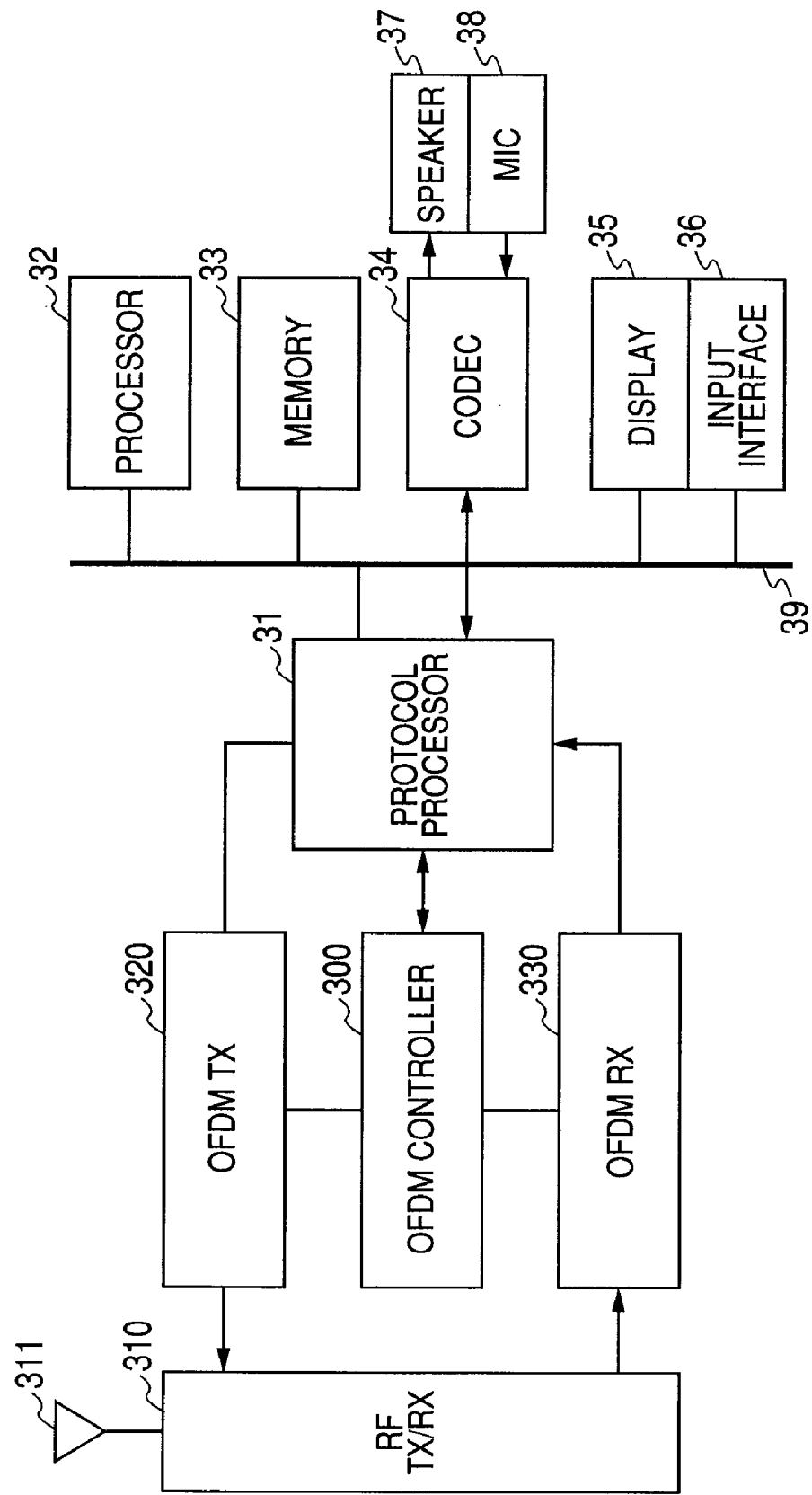
FIG. 8 is a block diagram showing one embodiment of the radio mobile station device 30 to which the HARQ transmission control by the present invention is applied.

FIG. 8 is a block diagram showing one embodiment of the radio mobile station device 30 to which the HARQ transmission control by the present invention is applied.

The mobile station 30 is composed of: a radio frequency transmission and reception circuit (RF TX/RX) 310 connected to an antenna 311; an OFDM transmission circuit (OFDM TX) 320 and an OFDM reception circuit (OFDM RX) 330 both connected to the RF TX/RX 310; an OFDM control 300 and a protocol processor 31 both connected to these OFDM TX 320 and OFDM RX 330; a processor 32, memory 33, a voice CODEC 34, a display 35, and an input interface 36 all connected to a buss 39; and a speaker 37 and a mic 38 both connected to a CODEC 34. Various kinds of control routines and application programs that the processor 32 performs are prepared for the memory 33.

A mobile station user performs screen selection, selection of a telephone number or destination address, data input, and transmission and reception operations using input operation buttons and the display 35 prepared in the input interface 36.

The voice inputted from the mic 38 is converted into coded voice data by the CODEC 34. The coded voice data outputted from the CODEC 34 and the transmitted data read from the memory 33 are converted into a transmitted packet in the protocol processor 31, and is inputted into the OFDM TX 320.

The OFDM TX 320 converts the transmitted packet into subpackets, and outputs them to the RF TX/RX 310. The RF TX/RX 310 coverts the transmitted subpackets into a radio frequency signal and after power amplifying it, transmits it to the base station 10 from the antenna 311. Moreover, the received signal from the base station 10 received with the antenna 311 is converted into a baseband signal with the RF TX/RX 310, and subsequently is inputted into the OFDM RX 330.

Figure 3:
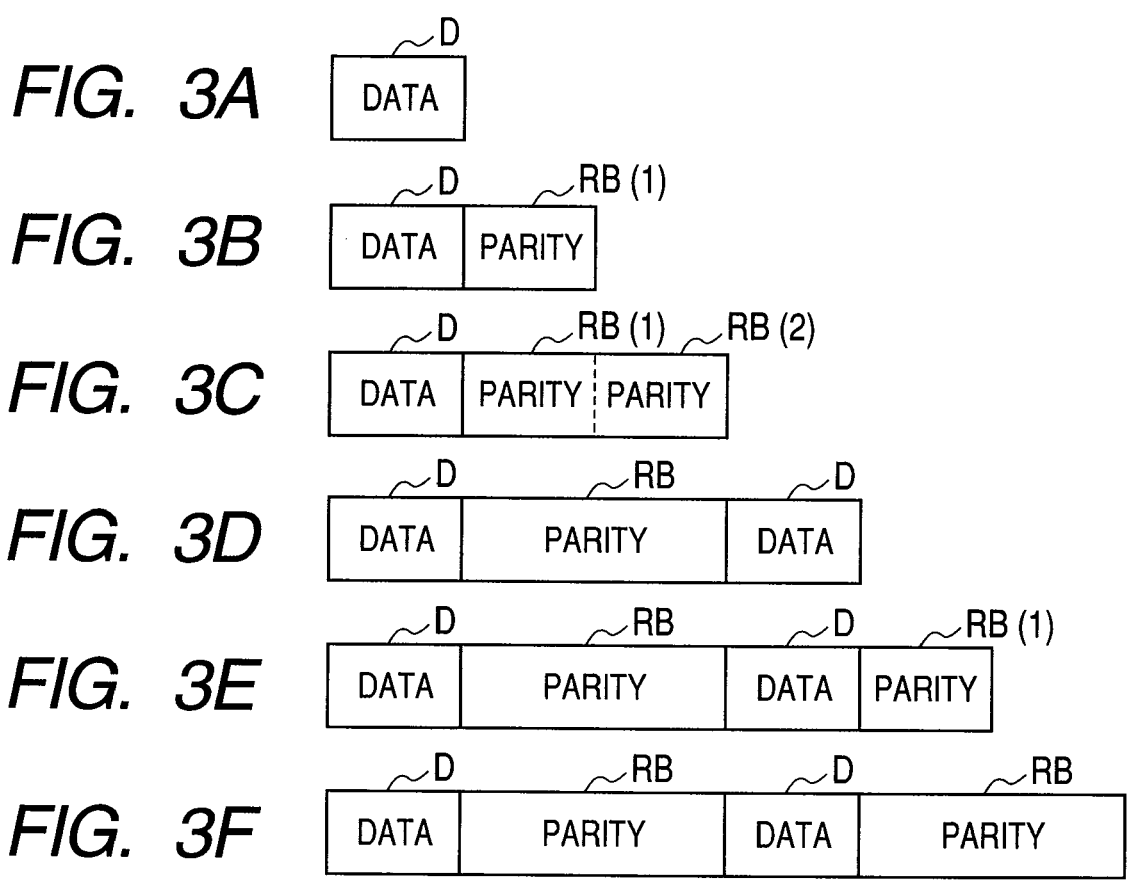

The OFDM RX 330 performs decoding processing of the received data explained in FIG. 3. The received data decoded by the OFDM RX 330 is outputted to a receive buffer on the CODEC 34 or the memory 33 through the protocol processor 31. The CODEC 34 converts the received coded voice signal into an analog voice signal, and outputs it to the speaker 37. The received data accumulated in the receive buffer is processed by the processor 32, and is transferred to a specific file area on the memory 33 or the display 35 according to an application.

Figure 2:
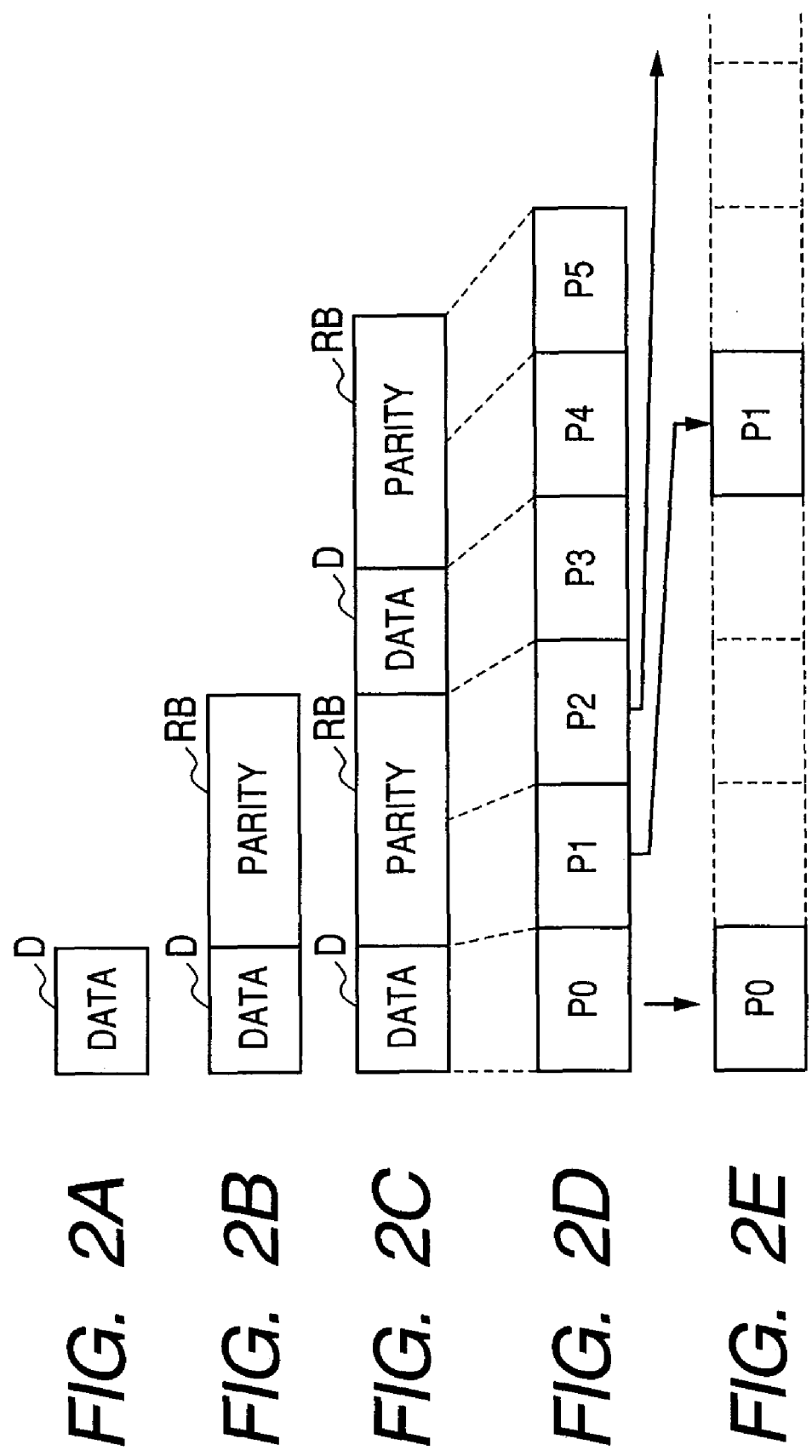

The OFDM control 300 performs the HARQ transmission control explained in FIG. 2, FIG. 3, and FIG. 7 in cooperation with the OFDM TX 320 and the OFDM RX 330.

Figure 9:
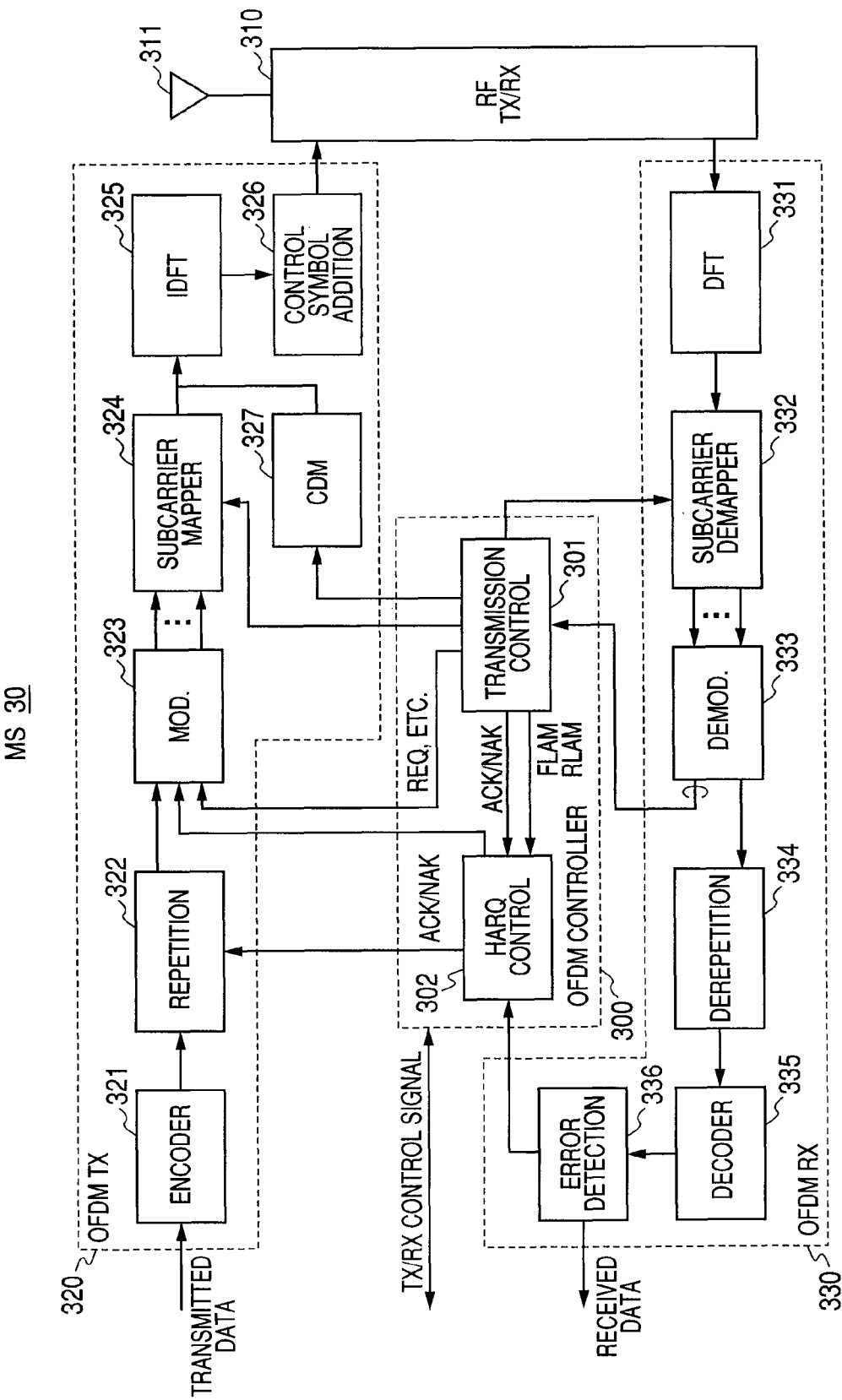
FIG. 9 is a diagram showing one embodiment of an OFDM control 300, an OFDM transmission circuit (OFDM TX) 320, and an OFDM reception circuit (OFDM RX) 330 of FIG. 8.

FIG. 9 shows one embodiment of the OFDM control 300, the OFDM TX 320, and the OFDM RX 330.

The OFDM TX 320 is composed of, for example: an encoder 321 for generating a transmitted packet added with parity bits by turbo encoding the transmitted data; a repetition 322 that converts the transmitted packet outputted from the encoder 321 and cyclically outputs them in order from the top subpacket in conformity to a command from the OFDM control 300; a modulator (Mod) 323 for modulating a subpacket outputted from the repetition 322 (a signal of a data channel) and signals of the control channel and the pilot channel outputted from the OFDM control 300; a subcarrier mapper 324 for mapping modulated symbol sequences of multiple channels outputted from the Mod 323 to respective predetermined subcarriers of the OFDM; an inverse Fourier transform (IDFT) unit 325 connected to the subcarrier mapper 324; a control symbol addition 326 that adds a synchronization symbol that is needed by a reception circuit of the base station, for example, Continuous Pilot (CP), and other control symbols to the data symbol outputted from the IDFT 325, and outputs it to the RF TX/RX 310; and a CDM multiplexer (CDM) 327.

The CDM 327 multiplexes multiple kinds of signals that the OFDM control 300 transmits in the CDMA channel. The output of the CDM 327 is inputted into the IDFT 325 together with the output of the subcarrier mapper 324.

On the other hand, the OFDM RX 330 is composed of: a discrete Fourier transform (DFT) unit 331 for Fourier transforming received baseband symbols inputted from the RF TX/RX 310; a subcarrier demapper 332 for extracting a signal sequence on multiple subcarriers specified beforehand from the output of the DFT 331; a demodulator (demod) 333 for demodulating signal sequences of the data channel, the control channel, and the pilot channel outputted from the subcarrier demapper 332; a derepetition 334 for combining the subpackets outputted as demodulated symbol sequences of the data channel from the demod 333 in the order of reception; a decoder 335 for decoding the received data from the output of the derepetition 334; and an error detection 336 connected to the decoder 335.

The error detection 336 detects whether the received data is successfully decoded by the decoder 335, informs the OFDM control 300 of the detection result, and transfers the received data that was successfully decoded to the protocol processor 31.

The OFDM control 300 includes a transmission control 301 and an HARQ control 302.

Multiple demodulated symbol sequences of the control channel and the pilot channel that are outputted in parallel from the demod 333 are inputted into the transmission control 301. The transmission control 301 detects the resource assignment message (the FLAM/RLAM) that the base station 10 transmitted from the demodulated symbol sequences of F-SCCH, which is one of the control channels, and informs the HARQ control 302 of the resource assignment information that the FLAM/RLAM indicates. At the same time, the transmission control 301 extracts the ACK/NAK that the base station 10 transmitted from the demodulated symbol sequences of F-ACKCH, which is one of the control channels, and informs the HARQ control 302 of this. Moreover, the transmission control 301 generates information of a resource assignment request and others that should be transmitted to the base station 10, and outputs it to the Mod 323.

The HARQ control 302 performs the HARQ control based on the resource assignment information informed from the base station 10 through the transmission control 301. Upon reception of data, the HARQ control 302 generates the ACK/NAK according to a determination signal of the decoding result outputted from the error detection 336, and outputs this to the Mod 323. Moreover, when transmitting data, the HARQ control 302 controls the repetition 322 according to the ACK/NAK informed from the base station 10 through the transmission control 301, and when the NAK is received, retransmits the subpacket at predetermined frame timing that conforms with the retransmission control mode until the number of times of retransmission reaches a limiting value.

Figure 10:
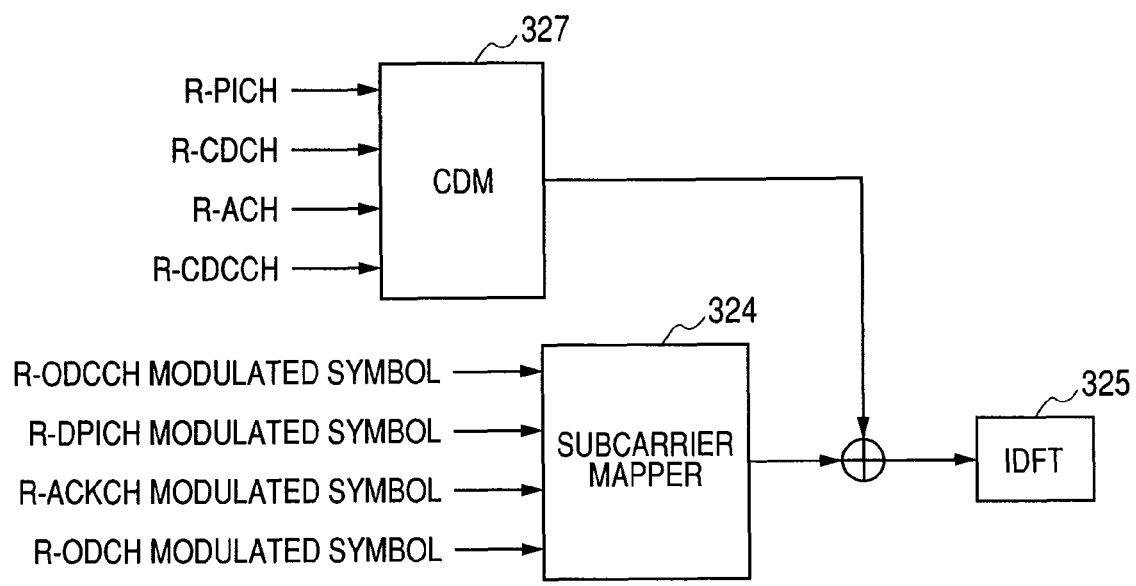
FIG. 10 is a diagram showing a main channel in which transmission is done from the mobile station 30 to the base station 10 in the reverse link, and transmission information.

FIG. 10 shows main channels on which the base station 10 makes transmission to the each mobile station 30 in the reverse link and transmission information.

The subcarrier mapper 324 is supplied with, for example, a modulated symbol sequences of a control channel (R-ODCCH; Reverse OFDMA Dedicated Control Channel), a modulated symbol sequence of a pilot channel (R-DPICH; Reverse Dedicated Pilot Channel), a modulated symbol sequence of an ACK channel (R-ACKCH; Reverse Acknowledge Channel), and a modulated symbol sequence of a data channel (R-ODCH; Reverse OFDM Data Channel) from the Mod 323. These modulated symbol sequences are inputted into the IDFT 325 together with the CDM multiplexed signals outputted from the CDM 327.

The CDM 327 supplies signals of a CDMA pilot channel: R-PICH (Reverse Pilot Channel), R-CDCH (Reverse CDMA Data Channel), R-ACH (Reverse Access Channel), and R-CDCCH (Reverse CDMA Dedicated Control Channel). For the resource assignment request channel shown in FIG. 5, transmission is done in the R-ODCCH or the R-CDCCH.

Figure 11:
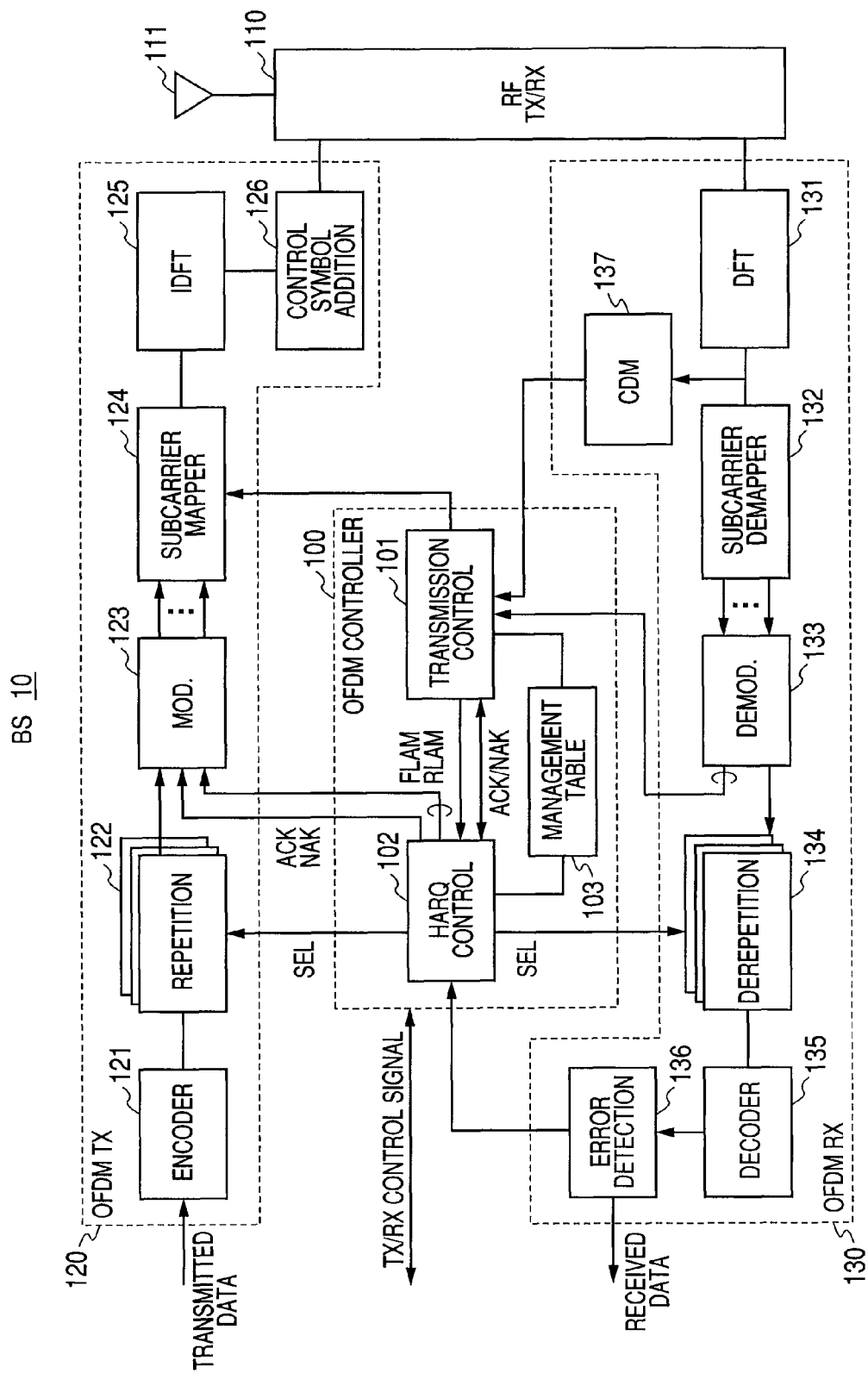
FIG. 11 is a diagram showing one embodiment of an OFDM control 100, an OFDM TX 120, and an OFDM RX 130 of the base station 10.

FIG. 11 shows one embodiment of an OFDM control 100, an OFDM TX 120, and an OFDM RX 130 of the base station 10.

The OFDM TX 120 is composed of: an encoder 121 for generating a transmitted packet added with parity bits by turbo coding the transmitted data; multiple repetitions 122 each of which converts a transmitted packet outputted from the encoder 121 into multiple subpackets and cyclically outputs the subpackets in order from the top subpacket according to a command from the OFDM control 100; a modulator 123 for modulating the subpacket (data channel signal) outputted from the repetition 122 and signals of the control channel and the pilot channel outputted from the OFDM control 100; a subcarrier mapper 124 for mapping demodulated symbol sequences of multiple channels outputted from the modulator 123 to predetermined subcarriers of OFDM, respectively; an inverse Fourier transform (IDFT) unit 125 connected to the subcarrier mapper 124; and a control symbol addition 126 that adds a synchronization symbol that an RX of the mobile station needs, for example, CP (Continuous Pilot) and other control symbols to the data symbol outputted from the IDFT 125 and outputs it to an RF TX/RX 110. The repetition 122 corresponds with the interlace number, and the OFDM control 100 selects different repetition for each frame period.

On the other hand, the OFDM reception circuit 130 is composed of: a discrete Fourier transform (DFT) unit 131 for Fourier transforming the received baseband symbol inputted from the RF TX/RX 110; a subcarrier demapper 132 for extracting signal sequences on multiple subcarriers specified beforehand from the output of the DFT 131; a demodulator 133 for demodulating signal sequences of a data channel, a control channel, and a pilot channel outputted from the subcarrier demapper 132; multiple derepetitions 134 each for combining the subpackets outputted from the demodulator 133 as demodulated symbol sequences of the data channel in the order of reception; a decoder 135 for decoding the received data from an output of the derepetition 134; an error detection 136 connected to the decoder 135; and a CDM demultiplexer 137 connected to the DFT 131.

The derepetition 134 also corresponds with the interlace number. A different derepetition is selected by the OFDM control 100 for every frame period. The error detection 136 detects whether the received data is successfully decoded by the decoder 135, informs the OFDM control 100 of the detection result, and at the same time transfers the received data that was successfully decoded to an unillustrated protocol processor.

The OFDM control 100 of the base station includes a transmission control 101, an HARQ control 102, and a management table 103. The management table 103 stores, for example, interlace management information and frequency resource (subcarrier) management information.

The followings have been inputted into the transmission control 101: multiple demodulated symbol sequences of the control channel and the pilot channel outputted in parallel from the demodulator 133; the received signal of the CDMA outputted from the CDM separation 137; and a transmission and reception control signal (TX/RX control signal) from the protocol control. When the transmission control 101 extracted the ACK/NAK transmitted from the mobile station out of the demodulated symbol sequences of the R-ACKCH, it informs the HARQ control 102 of the ACK/NAK.

When the transmission control 101 detects a resource assignment request REQ transmitted by the mobile station 30 from demodulated symbol sequences of R-ODCCH and R-CDCCH, it generates the RLAM indicating resource assignment information by referring to the management table 103; when it receives a request to send data from the protocol control, it generates the FLAM. These resource assignment messages are informed to the HARQ control 102, and are transmitted to the mobile station from the HARQ control 102 at predetermined timing. Moreover, the transmission control 101 generates the pilot signal and various kinds of control channel information that should be transmitted to the mobile station, and outputs them to the modulator 123.

Based on the FLAM/RLAM informed from the transmission control 101, the HARQ control 102 starts the HARQ transmission control, and selects different repetition 122 and derepetition 134 for every frame period according to the interlace information indicated by the management table 103. The HARQ control 102 generates the ACK/NAK according to a determination signal of a decoding result outputted from an error detection 136 at the time of receiving data from the mobile station, and outputs it to the modulator 123 in a predetermined frame period that complies with interlace information indicated by the management table 103. Moreover, at the time of data transmission, the HARQ control 102 controls the repetition 322 according to the ACK/NAK informed from the mobile station through the transmission control 101, and when the NAK is received, retransmits the subpacket at a predetermined frame timing that conforms with the control mode until the number of times of retransmission reaches a limiting value.

Figure 12:
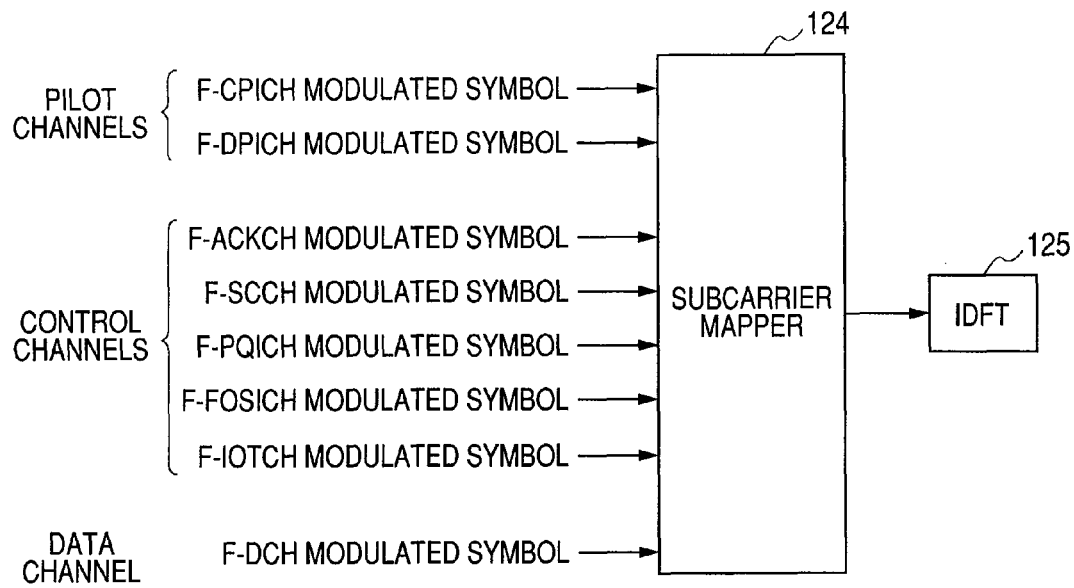
FIG. 12 is a diagram showing main channels in which transmission is done from the base station 10 to the each mobile station 30 in the forward link, and transmission information.

FIG. 12 shows main channels on which the base station 10 makes transmission to the each mobile station 30 in the forward link and transmission information.

The subcarrier mapper 124 is supplied with modulated symbols of the pilot channel and the control channel in addition to the modulated symbol sequence of a data channel: the F-DCH (Forward Link Data Channel) from the modulator 123.

The pilot channel includes, for example. an F-CPICH (Forward Link Common Pilot Channel) shared by all the mobile stations and an individual F-DPICH (Forward Link Dedicated Pilot Channel) of each mobile station. The control channel includes, for example, an Forward Link Acknowledge Channel (F-ACKCH), a transmission channel of the RLAM/FLAM: F-SCCH (Forward Link Shared Control Channel), a transmission channel of PQI: F-PQICH (Forward Link Pilot Quality Indication Channel), a transmission channel of interference information: F-FOSICH (Forward Link Fast Other Sector Indication Channel), and an F-IOTCH (Forward Link Interference over Thermal Channel).

Figure 13:
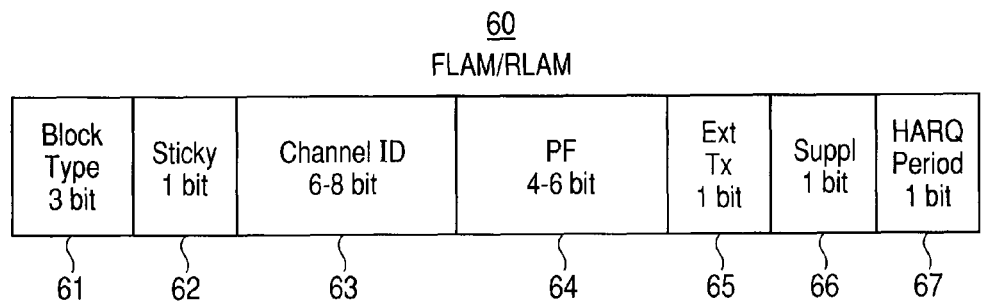
FIG. 13 is a format of FLAM/RLAM that is transmitted from the base station 10 to the mobile station 30.

FIG. 13 shows a format of the FLAM/RLAM that is transmitted to the mobile station 30 from the base station 10. In the present invention, the HARQ transmission control mode can be specified by a specific field provided in the FLAM/RLAM.

The FLAM/RLAM 60 is composed of a block type field 61 indicating the kind of the message, a flag field 62 showing whether the resource assign mode is the Sticky Assignment mode or the Non-sticky Assignment mode, a channel ID field 63 indicating an identifier of the frequency resource assigned to the mobile station, a field 64 indicating a packet format, a flag field 65 showing whether the mode is an extended transmission mode, and a flag field 66 showing whether the assignment is additional assignment.

In the present invention, a flag (HARQ interval flag) field 67 showing whether the subpacket retransmission control is performed in a shortened interval is added to the FLAM/RLAM 60. For example, the mobile station that received the FLAM or RLAM whose flag field 67 is set to "1" performs the HARQ transmission control in a control mode in which the HARQ transmission interval is shortened between itself and the base station. On the other hand, the base station 10 stores a mobile station identifier, an assigned frequency resource, an HARQ transmission interval (or HARQ interval flag indicating whether the control mode is the low latency mode), and a relation with an ACK identifier (ACK ID) that will be described later, being associated with an interlace number, in the management table 103. What is necessary when the FLAM/RLAM 60 is transmitted to a certain mobile station 30-$j$ is that the HARQ control 102 stores an HARQ transmission interval of a control mode specified by the flag field 67, being associated with the interlace number assigned to the mobile station 30-j, and after this the base station 10 communicates with the mobile station 30-j in an HARQ transmission interval that the management table 103 indicates.

Returning to FIG. 7, in the HARQ control of interlace number 0 where the HARQ transmission interval was shortened, in the frame F2, the data reception node that received the subpacket P0 sends back the ACK/NAK response that would be send back in the frame F5 if the mode was the normal mode, and receives the next subpacket in the frame F4. In this case, the frame F4 collides with the transmission interval of the subpacket of interlace number 4. Therefore, when transmitting data to the mobile station from the base station 10, the base station may invalidate interlace number 4 during performing the retransmission control of the low latency mode with interlace number 0.

Moreover, as shown by the frame F6, if the transmission control of the low latency mode is performed in any one of interlace numbers, multiple ACK/NAK responses will occur in the same frame period. Therefore, the base station needs to be configured to be able to multiplex the ACK/NAK response of the normal transmission mode and the ACK/NAK response of the low latency mode and transmit/receive it. Multiplexing of the ACK/NAK responses is needed in each of the forward link and the reverse link.

Figure 14A:
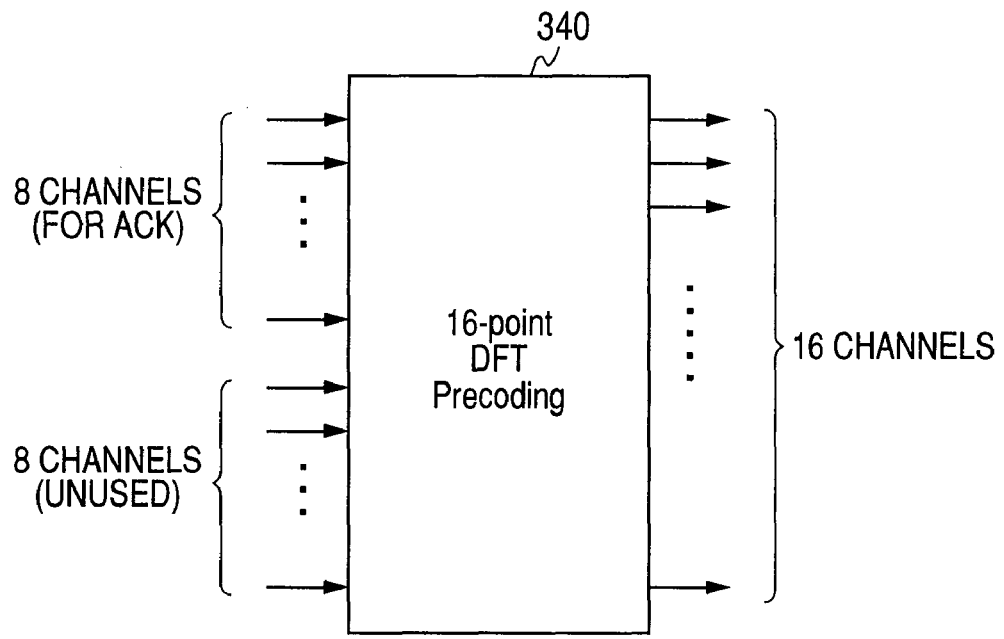
FIGS. 14A-B are diagrams for explaining a transmission method of ACK/NAK of the conventional system where the HARQ control of a normal transmission mode is performed at all the mobile stations.

When the HARQ transmission interval is shortened in data transmission in the forward link, the ACK/NAK responses transmitted from the multiple mobile stations need to be multiplexed in the R-ACKCH. Here, in order to make understanding of the present invention easy, a transmission method of the ACK/NAK in the conventional system whereby the HARQ control of the normal mode is performed in all the mobile stations will be explained by referring to FIG. 14.

In OFDM, the modulated symbols are transmitted by multiple subcarriers that have a certain subcarrier interval. For example, in the case of the OFDM system whose number of subcarriers is 512, a frequency band composed of the subcarriers f(0) to f(511) is divided into 32 domains each having a unit of 16 subcarriers and the each domain is defined as an "IOFDMA tile." The base station 10 assigns one or multiple OFDMA tiles to each mobile station, and each mobile station makes data transmission by the OFDMA using a subcarrier group of the OFDMA tiles assigned thereto.

Figure 14B:
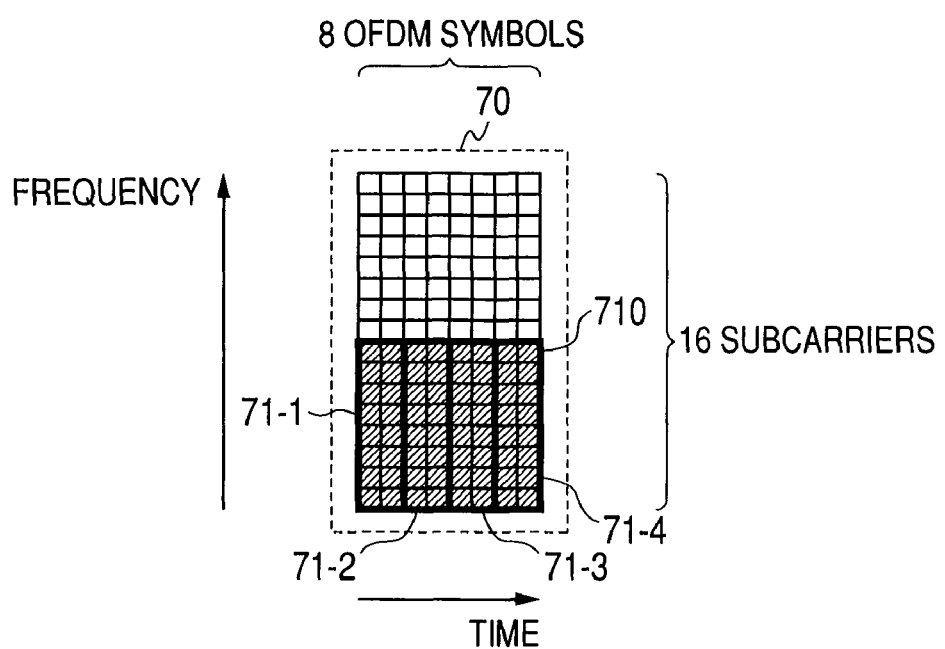

FIG. 14B shows one OFDMA tile 70. The OFDMA tile 70 shown here has the size of 16 subcarriers in the frequency domain and eight OFDM symbols in the time domain.

The mobile station 30 performs OOK (On-Off Keying) modulation by making the ACK and the NAK correspond to the on state and the off state, respectively. In the R-ACKCH, the data is sent using four subtiles 71-1 to 71-4 having the size of "eight subcarriers"×"2 OFDM symbols" shown by thick solid lines in FIG. 14B. The mobile station 30 maps the ACK/NAK responses that were OOK modulated to the subtiles 71-1 to 71-4 with a DFT precoder 340 of 16 points shown in FIG. 14A. Among 16 channels of inputs of the DFT precoder 340, the eight channels are used for the ACK/NAK responses, and the remaining eight channels are kept unused. In this case, the mobile station can transmit eight ACK ID's with one subtile 71. The unused channel can be used, for example, for interference estimation or for the ACK/NAK response in MIMO (Multiple-Input Multiple-Output).

Diversity gain can be obtained by repeatedly transmitting multiple subtiles on which the ACK/NAK responses are mapped as in 71-1 to 71-4.

In the illustrated example, the four subtiles 71-1 to 71-4 for the R-ACKCH occupy a half of the OFDMA tile 70. The four subtiles 71-1 to 71-4 are collectively called an "R-ACKCH tile" 710.

When performing subpacket retransmission in a control mode in which the HARQ transmission interval is shortened in data transmission in the forward link, the base station 10 must multiplex the ACK/NAK response of the normal mode and the ACK/NAK response of the low latency mode in the F-ACKCH. After modulating the each ACK/NAK response, the base station 10 maps them to the OFDMA tile with a DFT precoder of 16 points.

Figure 15:
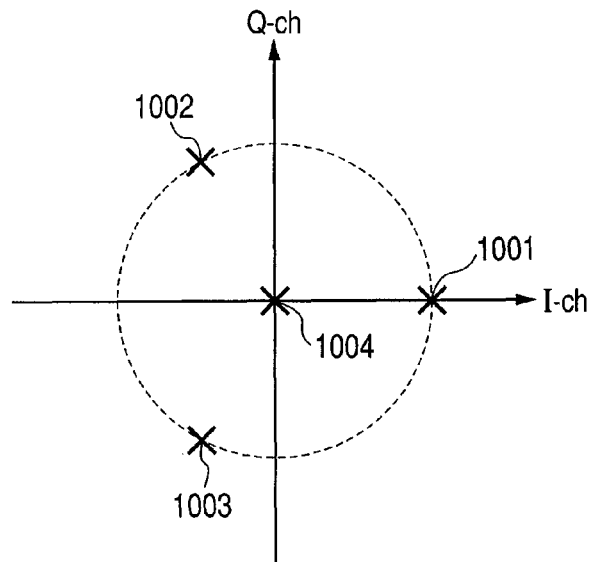
FIG. 15 is a diagram showing one example of a modulation method of ACK/NAK responses in F-ACKCH.

FIG. 15 shows one example of a modulation method of the ACK/NAK response in the F-ACKCH. In the example shown here, the F-ACKCH has four constellation points. A constellation point 1001 designates the ACK and a constellation point 1004 designates the NAK. A constellation point 1003 designates De-assign that indicates deassignment of the frequency resource that was informed to the mobile station by the RLAM, and a constellation point 1002 designates the ACK response and the De-assign simultaneously.

Figure 16:
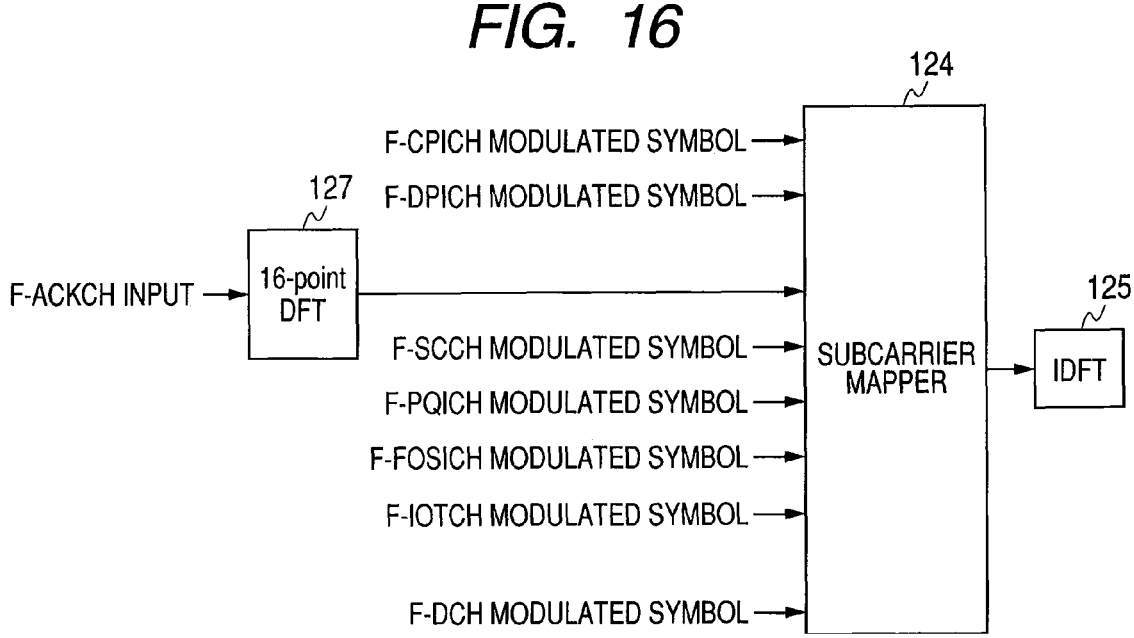
FIG. 16 is a diagram showing one example of a configuration of a transmitter of the ACK/NAK responses in the base station.
Figure 17:
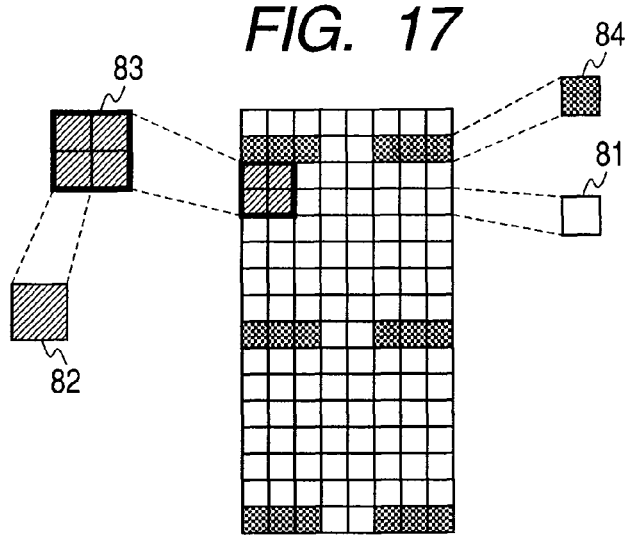
FIG. 17 is a diagram for explaining a relation between the ACK/NAK responses and an OFDMA tile.

The modulated ACK/NAK responses are mapped to, for example, the OFDMA tiles with the DFT precoder 127 of 16 points, as shown in FIG. 16. The OFDMA tile 80 is composed of an OFDMA slot 81 of "16 subcarriers"×"8 OFDM symbols," as shown in FIG. 17. The ACK/NAK responses are CDM (Code Division Multiplexing) multiplexed with orthogonal spreading codes, and are transmitted using an F-ACKCH segment 83 composed of 4×4 F-ACKCH slots shown by slashes. Moreover, in order to obtain frequency diversity gain, the F-ACKCH segment 83 is transmitted with the multiple OFDMA tiles. Incidentally, in FIG. 17, a reference numeral 84 indicates an OFDMA slot for pilot signal.

When the mobile station 30 sends back the ACK/NAK response to data that the base station 10 transmitted by shortening the HARQ transmission interval of a subpacket in the forward link, conventionally, as was explained in FIG. 14, a maximum of eight ACK ID's were able to be transmitted with one R-ACKCH tile, except for the channel for MIMO. A maximum number of ACK ID's that has a possibility of simultaneous transmission is determined by the number of the OFDMA tiles used by the OFDMA system. For example, in the OFDMA system of 512 subcarriers described above, since a maximum of 32 OFDMA tiles consisting of 16 subcarriers are formed, when one OFDMA tile of each mobile station is assigned to one ACK ID, respectively, there is a possibility that a maximum of 32 ACK ID's may be used simultaneously. In this case, it is necessary to prepare four R-ACKCH tiles in the OFDMA system of 512 subcarriers.

However, when the multiple OFDMA tiles are assigned to the mobile station that needs a high transmission rate, the number of ACK ID's practically used in the OFDMA system becomes fewer than a maximum of 32 because the mobile station can transmit and receive each data packet using these multiple OFDMA tiles simultaneously. In this case, ACK ID's that remain unused can be used for the ACK/NAK response that are sent back in the low latency mode.

Figure 18:
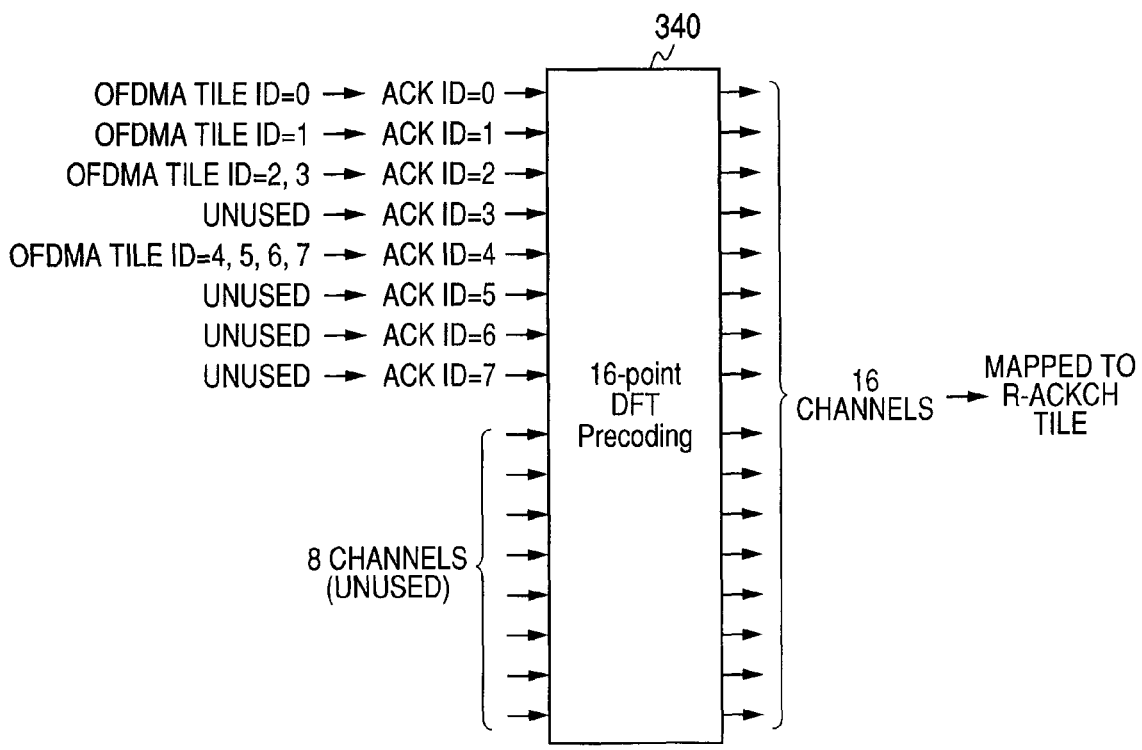
FIG. 18 is a diagram showing one example of an operating condition of an ACK ID.

FIG. 18 shows one example of the state of use of the ACK ID. Here, since the OFDMA tile with tile ID's of "0" and "1" are assigned to separate mobile stations, regarding the subpackets transmitted with these OFDMA tiles, their ACK/NAK responses are sent back using the ACK ID's="10" and "1," respectively. The OFDMA tiles whose tile ID's are "2" and "3" are assigned to the same mobile station. In this case, since two OFDMA tile ID's="2" and "3" are applied to one subpacket, the ACK/NAK response can be sent back using one ACK ID="2."

In the illustrated example, four OFDMA tiles with tile ID's of "4" to "7" are assigned to the same mobile station, and one packet is transmitted using OFDMA tile ID's="4," "5," "6," and "7." Therefore, the ACK/NAK response for this packet can be sent back using one ACK ID="4."

In the example of FIG. 18, despite assignment of a total of eight OFDMA tiles to the mobile station, ACK ID's="3," "5," "6," and "7" become in an unused state. Then, for example, the ACK ID having a minimum ID value is selected sequentially among the ACK ID's in the unused state, and it can be assigned for the ACK/NAK response of the low latency mode. In the illustrated state, the mobile station in the low latency mode can send back the ACK/NAK using ACK ID="3."

Which ACK ID is used for the ACK/NAK response in each interlace in which the HARQ control is conducted in HARQ transmission interval of the normal transmission mode is known to the base station 10. Therefore, in the interlace in which the HARQ transmission interval is shortened, when the ACK/NAK response is sent back with ACK ID=3, the base station can detect that the ACK/NAK response is transmitted in the low latency mode. At this time, the ACK/NAK response transmitted with ACK ID=3 does not have any harmful influence whatever on the ACK/NAK responses of the normal mode that are transmitted with ACK ID of "0," "1," "2," and "4."

In the present invention, in the case where the HARQ transmission interval of the subpacket is shortened in data transmission in the forward link, an R-ACKCH tile that is different from that of the ACK/NAK response of the normal mode can be used for the ACK/NAK responses of the low latency mode that is sent back in the R-ACKCH.

Figure 19:
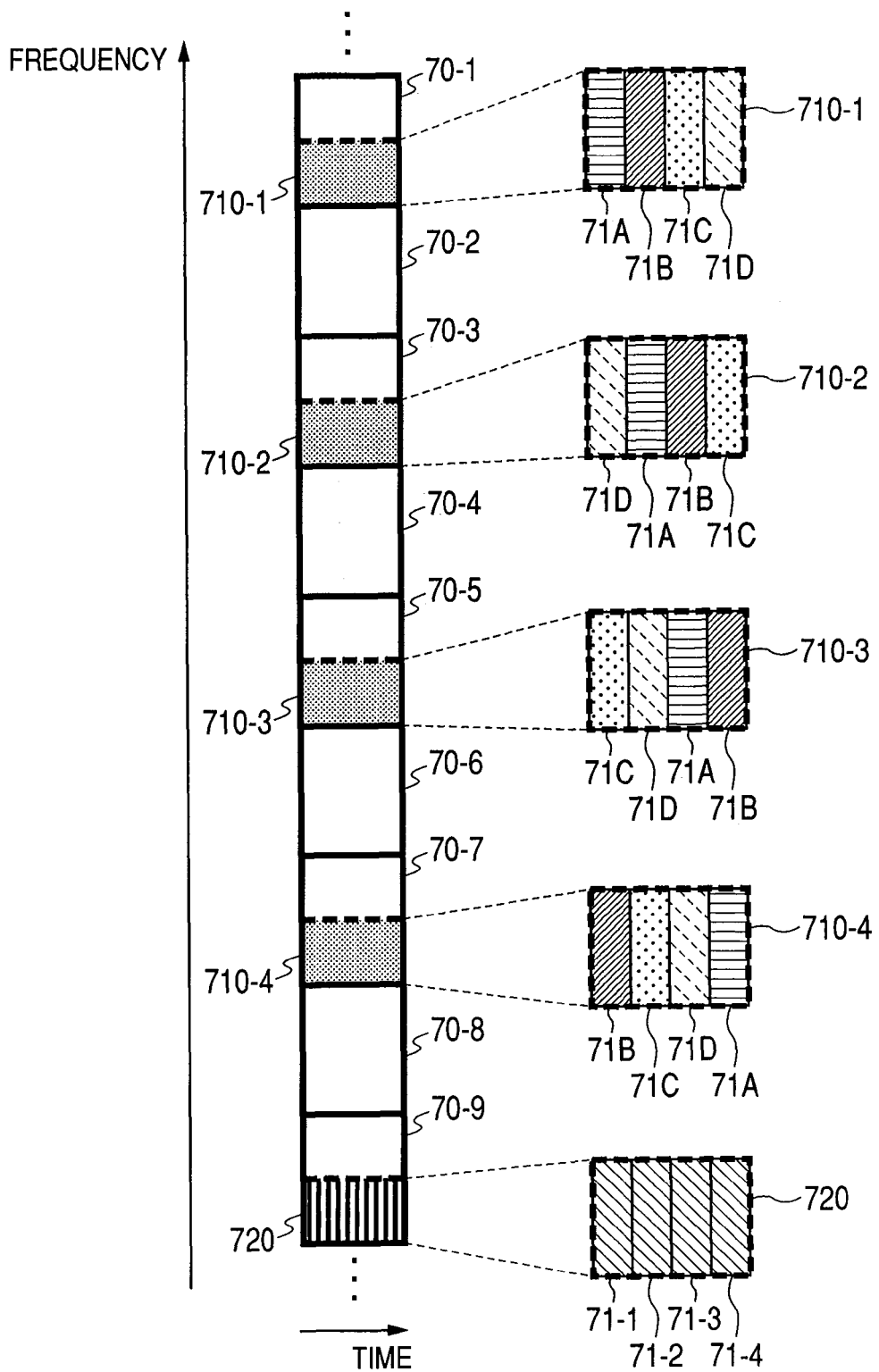
FIG. 19 is a diagram showing one example of an arrangement method of an R-ACKCH tile.

For example, FIG. 19 shows one example of an arrangement method of the R-ACKCH tiles with a vertical axis (frequency) of OFDM and a horizontal axis of time. Here, the four OFDMA tiles 70 (70-1, 70-3, 70-5, and 70-7) are used, and the four R-ACKCH tiles 710-1 to 710-4 are prepared.

In this embodiment, four different subtiles 71A to 71D are transmitted in the respective R-ACKCH tiles 710-$i$ ($i$=1 to 4). As shown in the right-hand side of FIG. 19, in every transmission, each subtile 71 is transmitted four times in total by changing the R-ACKCH tiles 710-1 to 710-4 to be used in each transmission.

As explained in FIG. 14B, each subtile 71 has the size of eight subcarriers×two OFDM symbols, and can transmit eight ACK ID's. Therefore, in the example shown in FIG. 19, a total of 32 ACK ID's can be transmitted with the four R-ACKCH tiles 710-1 to 710-4. As illustrated, a frequency diversity effect is obtained by repeating transmission of each subtile while changing the R-ACKCH tile to be used.

In this embodiment, a fifth R-ACKCH tile 720 used for the ACK/NAK response of the low latency mode is prepared in the OFDMA tile 70-9, apart from the R-ACKCH tiles 710-I ($i$=1 to 4) used for the ACK/NAK responses of the normal mode.

When applying the low latency mode to data transmission addressed to a specific mobile station 30-$j$, the base station 10 assigns the R-ACKCH tile 720 for the low latency mode to the mobile station 30-$j$. The mobile station 30-$j$ sends back the ACK/NAK response using the R-ACKCH tile 720 assigned by the base station. In the illustrated example, the subtiles 71-1 to 71-4 contained in the R-ACKCH tile 720 are used, and up to eight ACK ID's for ACK/NAK responses of the low latency mode can be transmitted. With the R-ACKCH tile 720, time diversity gain is obtained by repeating transmission of the same subtile four times.

Incidentally, since an R-ACKCH tile different from that for the ACK/NAK responses of the normal mode is used for the ACK/NAK response of the low latency mode in this example, there is no possibility of exerting a harmful influence on other mobile stations.

In the case where the low latency mode is applied to data transmission in the forward link, it may be configured that the mobile station sends back the ACK/NAK response using an ACK channel that is in an unused state for interference estimation in the R-ACKCH.

Figure 20:
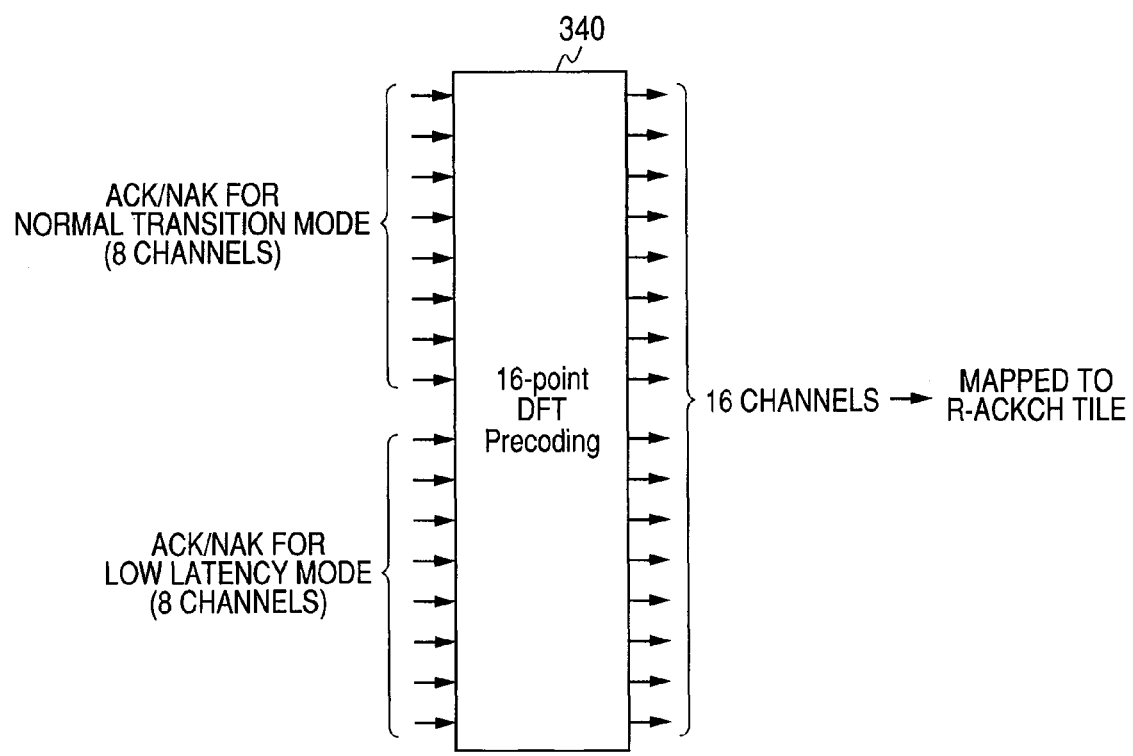
FIG. 20 is a diagram for explaining one example of the transmission method of the ACK/NAK responses of a low latency mode in the mobile station.

For example, as shown in FIG. 20, eight channels among 16 channel inputs of the DFT precoder 340 are used for the ACK/NAK responses of the normal mode, and the remaining eight channels in an unused state are used for the ACK/NAK responses of the low latency mode. In this case, since channels to be used are different, the base station side can distinguish clearly whether the received response belongs to the normal mode, or to the low latency mode. The eight channels used for the ACK/NAK responses of the low latency mode are conventionally in an unused state in order to be used for interference estimation and for MIMO. Therefore, as in this embodiment, if these channels are used for the ACK/NAK response, there is a possibility of affecting interference estimation. However, since the channels are orthogonal to one another although the ACK/NAK response is spread by the DFT precoder 340, there is no possibility that this embodiment may exert a harmful influence to the ACK/NAK responses of the normal mode.

Figure 21:
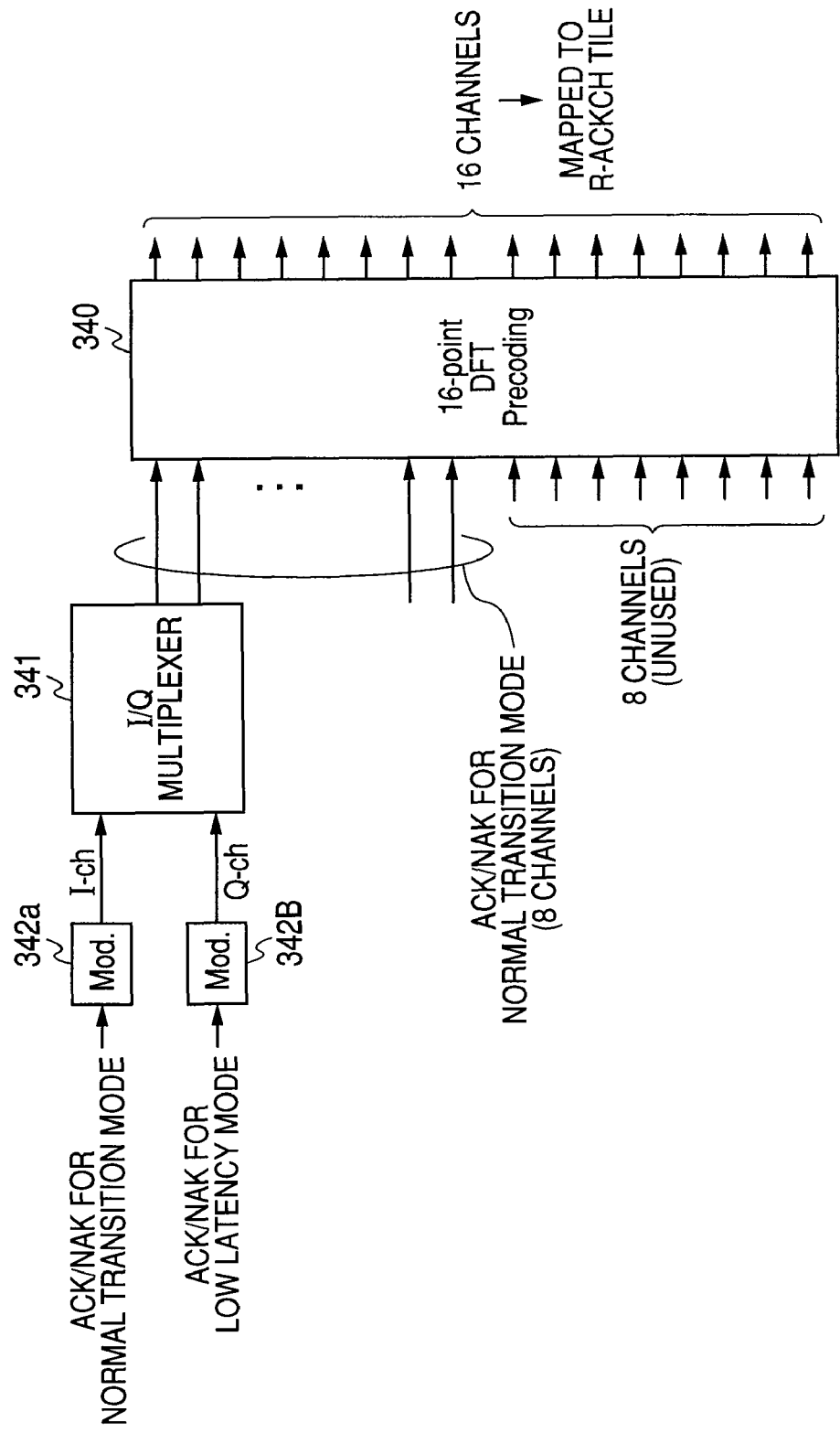
FIG. 21 is a diagram for explaining another example of the transmission method of ACK/NAK responses of the low latency mode in the mobile station.

FIG. 21 shows another embodiment of the transmitter of the ACK/NAK response in the case where the low latency mode is applied to data transmission in the forward link. In this embodiment, the ACK/NAK responses of the normal mode, and the ACK/NAK responses of the low latency mode are I/Q (In-phase/Quadrature) multiplexed in the R-ACKCH. The mobile station 30 OOK modulates the ACK/NAK responses of the normal mode with a modulation circuit 342A, and OOK modulates the ACK/NAK responses of the low latency mode with a modulation circuit 342B. Subsequently, it inputs the both responses into an I/Q multiplexing circuit 342. The ACK/NAK response of the normal mode and the ACK/NAK response of the low latency mode are brought into correspondence with the I channel (in-phase channel) and the Q channel (quadrature channel), respectively, and they are I/Q multiplexed.

The ACK/NAK responses on which I/Q (In-phase/Quadrature) multiplexing was performed are inputted into the DFT precoder 340 explained in FIG. 14, as one ACK ID. In the case of this embodiment, the base station 10 that receives R-ACHCH decodes the I channel and the Q channel, respectively, to obtain the ACK/NAK responses.

With the conventional technology explained in FIG. 14, the phase does not need to be taken into consideration in the modulation and demodulation of the ACK/NAK response. However, since in the case of this embodiment, the ACK/NAK responses that are different in HARQ transmission interval are transmitted in the I channel and in the Q channel, respectively, it is necessary for the reception side to demodulate the received signal of the R-ACHCH considering its phase.

Figure 22:
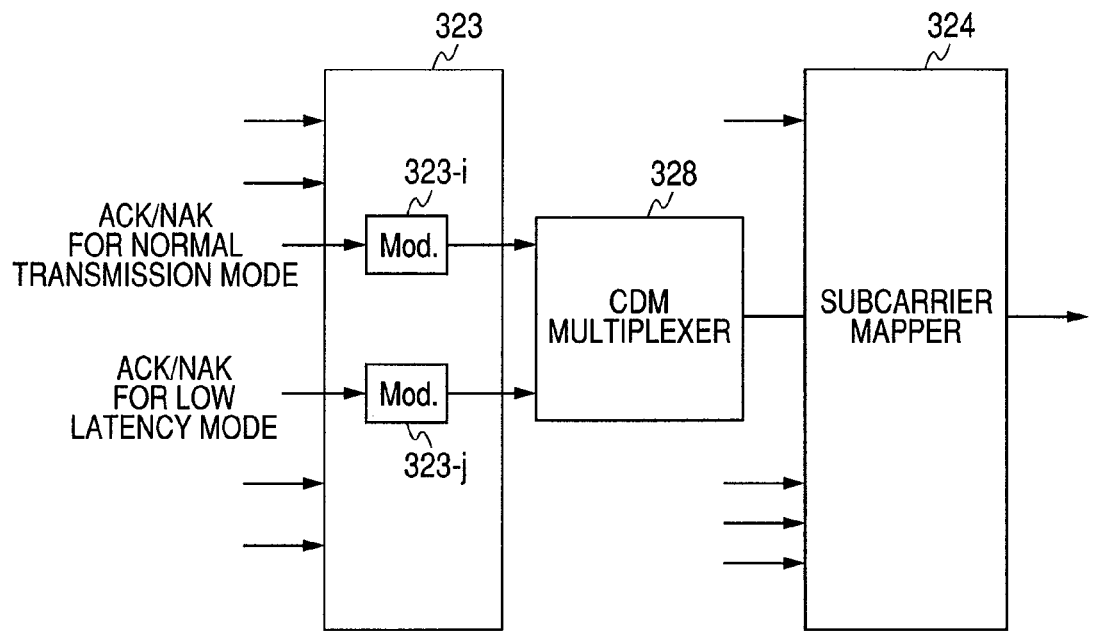
FIG. 22 is a diagram for explaining further another example of the transmission method of the ACK/NAK responses of the low latency mode in the mobile station.

In the present invention, the ACK/NAK response of the normal mode and the ACK/NAK response of the low latency mode may be CDM multiplexed using the CDM multiplexing orthogonal spreading codes, as shown in FIG. 22.

For example, the ACK/NAK response of the low latency mode generated by the HARQ control 302 of the mobile station 30 shown in FIG. 9 and the ACK/NAK response of the normal mode are inputted into the separate modulators 323-$i$ and 323-$j$ that constitute the Mod 323, and are modulated by a constellation diagram shown in FIG. 15, respectively. The ACK/NAK response of the normal mode and the ACK/NAK response of the low latency mode that were outputted from the Mod 323 are CDM multiplexed with the orthogonal spreading codes by a CDM multiplexer 328, and subsequently are supplied to the subcarrier mapper 324 of the OFDMA.

Since the base station 10 is informing the mobile station of resource information (frequency and time) of F-ACKCH in a predetermined interval, using this information, the base station thereby assigns to the mobile station a spreading code applied to the ACK/NAK responses of the normal mode and a spreading code applied to the ACK/NAK responses of the low latency mode.

If, like this embodiment, the ACK/NAK response of the normal mode and the ACK/NAK response of the low latency mode are CDM multiplexed using different spreading codes (orthogonal codes) for the respective responses, it becomes possible to make the base station transmit the ACK/NAK response of the low latency mode without affecting the ACK/NAK response of the normal mode.

When the ACK/NAK response is transmitted from the base station, for example, the F-ACKCH segment 83 explained in FIG. 17 is composed of four F-ACKCH slots 82, the base station can transmit up to four ACK/NAK responses by using one F-ACKCH segment of them. What the number of ACK/NAK responses that the base station wishes to transmit increases due to occurrence of the ACK/NAK response of the low latency mode apart from that of the normal mode, what is necessary is just to increase the number of the F-ACKCH segments 83.

Next, a determination method of the subpacket HARQ transmission interval applied to communication between the base station and the mobile station in the radio communication system of the present invention will be explained.

The base station and the mobile station must have recognized the subpacket retransmission control mode of HARQ in advance of data transmission. Regarding the retransmission control mode of the subpacket that should be applied to HARQ, what is necessary is for either the base station or the mobile station acting as a data transmission side to select either of the HARQ transmission interval normal mode or the low latency mode, for example, according to a kind of the transmitted data, and inform the reception side device of the selection result.

Figure 23:
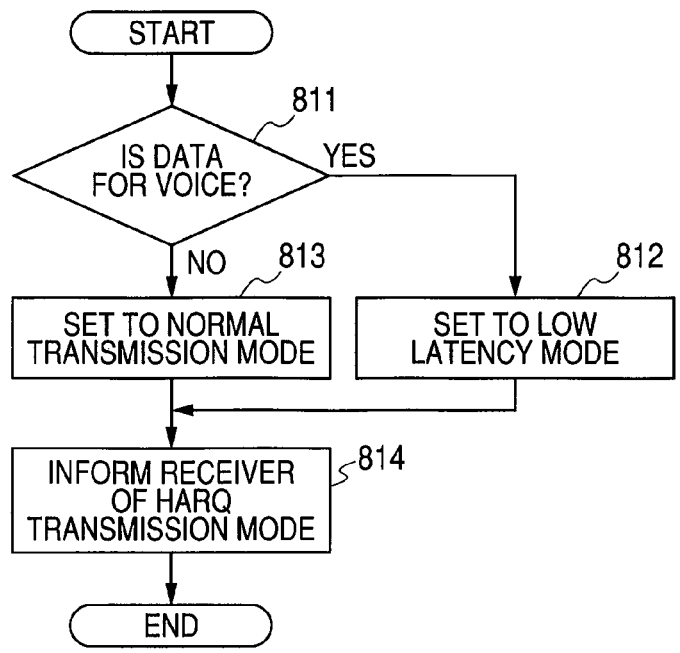
FIG. 23 is a diagram showing one embodiment of an HARQ transmission interval determination routine.

FIG. 23 shows one embodiment of the HARQ transmission interval determination routine performed by the data transmission side. Here, the transmission-side device determines whether the transmitted data is for voice (Step 811). When transmitting the voice data, the mode is set to the low latency mode (Step 812), and when otherwise, the mode is set to the normal transmission mode (Step 813), and informs the receiver of the selection result (Step 814).

Regarding the retransmission control mode (normal transmission mode/low latency mode) of the subpacket in HARQ, it may be configured that the mode has been determined, for example, in a call set-up sequence that is performed in advance of data communication, and the base station and the mobile station transmit and receive data in the same retransmission control mode until the call is finished. In this case, the following procedure is recommended in an execution process of the call set-up sequence: the transmission control 101 of the base station is configured to store a relation between the identifier of the radio mobile station and the retransmission control mode (or HARQ transmission interval) in the management table 103 and is configured to, when assigning reverse link/forward link communication resources to the mobile station, determine an interlace that conforms with the HARQ transmission interval; and the HARQ control 102 is configured to communicate with the mobile station according to the HARQ transmission interval and the interlace.

When making a call from the mobile station connected to the base station, the mobile station informs the base station of a retransmission control mode that is asked for, for example, in the retransmission control mode specification field defined beforehand in the call set-up control message. On the contrary, when the mobile station becomes a call-in side, what is necessary is for the base station to inform the mobile station of the retransmission control mode in the retransmission control mode specification field defined beforehand in the call set-up control message.

Since a resource is assigned on a transmitted packet basis in HARQ as described above, the retransmission control mode may be determined for each transmitted packet. For example, when transmitting a data packet to the base station from the mobile station, the mobile station requests assignment of a reverse link frequency resource with the mobile station specifying the retransmission control mode through the R-REQCH, and the base station assigns the reverse link frequency resource according to the retransmission control mode. On the contrary, when transmitting a data packet to the mobile station from the base station, the base station determines the retransmission control mode according to the kind of data of the transmitted packet, and informs the mobile station of the retransmission control mode, and a forward link frequency resource by the FLAM explained in FIG. 13.

Figure 24:
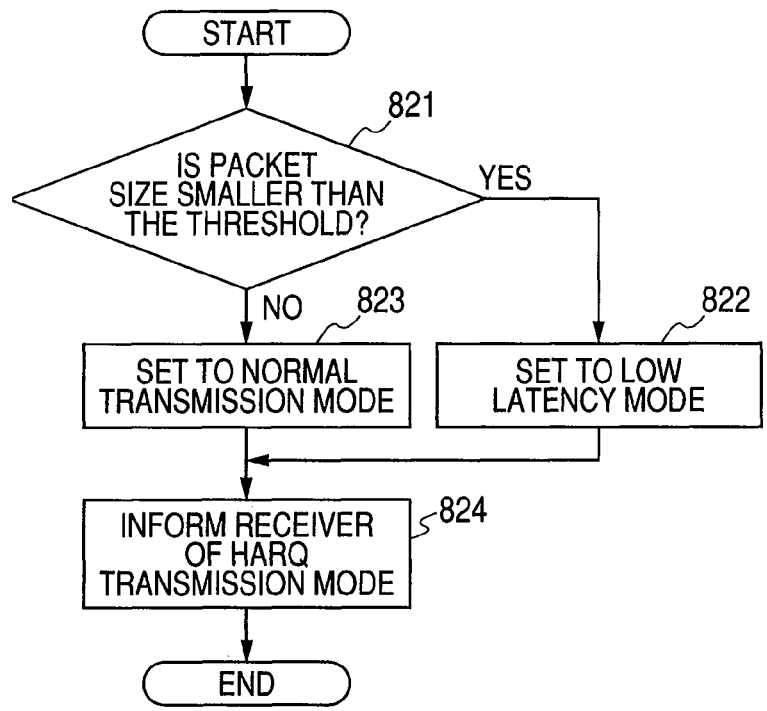
FIG. 24 is a diagram showing another embodiment of the HARQ transmission interval determination routine.

FIG. 24 shows another embodiment of the HARQ transmission interval determination routine performed by the data transmission side.

In this embodiment, the transmission-side device of the data compares the size of the transmitted packet with a threshold (Step 821), if the packet size is less than or equal to the threshold value, sets the mode to the low latency mode (Step 822), or if otherwise, sets the mode to the normal transmission mode (Step 823), and informs the receiver of the selection result (Step 824). Incidentally, in the case where the data transmission side device and the reception side device are holding a common packet size threshold in advance before the data transmission, for example, at the time of call set-up, it is not necessary to inform the receiver of the selection result of the low latency mode. Moreover, when not informing the selection result, the reception side device can determine whether the received packet is transmitted in the normal transmission mode, or in the low latency mode by comparing the received packet size with the threshold.

In the case where the mobile station and the base station transmit and receive a subpacket in the low latency mode, for example, the reception side device needs to send back by the frame F2 a ACK/NAK for a subpacket received by the frame F0 in interlace number 0 shown in FIG. 7. In this case, a threshold that is applied in a determination step 821 in FIG. 24 is determined by a packet size that the reception device can process demodulation and decoding thereof in an interval of the frames F0 to F1.

Figure 25:
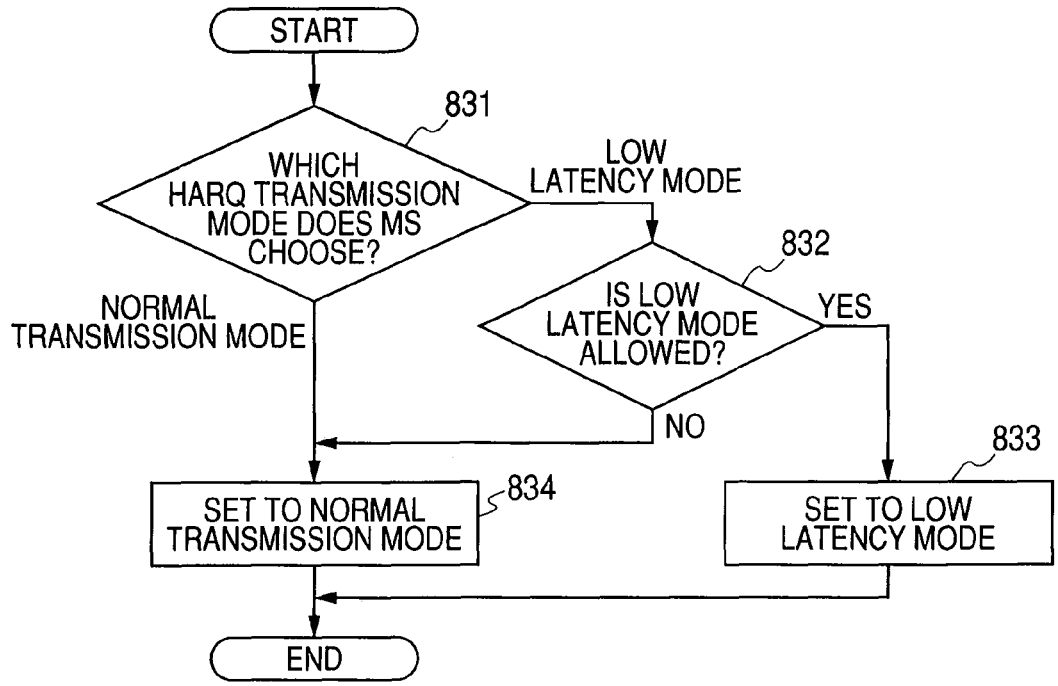
FIG. 25 is a diagram showing further another embodiment of the HARQ transmission interval determination routine.

FIG. 25 shows further another embodiment of the HARQ transmission interval determination routine.

For example, even when the mobile station selects the low latency mode based on the kind of or packet size of the transmitted data, the mobile station has no other choice but to apply the normal transmission mode depending on a communication state between the base station and the other mobile station. In this embodiment, the transmission control 101 of the base station that received information of the subpacket retransmission control mode from the mobile station determines the kind of informed retransmission control mode (Step 831), and if the mobile station is asking for the normal transmission mode, selects the normal transmission mode as an applied mode (Step 834). If the mobile station is asking for the low latency mode, the transmission control 101 determines a traffic situation of the reverse link direction with reference to the management table 103 (Step 832). If it is allowed to apply the low latency mode for communication with the mobile station, the mode is set to the low latency mode (Step 833); if the application is not allowed, the mode is set to the normal transmission mode (Step 834).

In the case where the retransmission control mode that the mobile station is asking for is informed, for example, by an assignment request of the reverse link resource that is transmitted in the R-REQCH, the transmission control 101 informs the mobile station of the retransmission control mode that is selected in the Step 833 or Step 834 together with an assignment result of the resource by the FLAM. In this embodiment, each mobile station will conduct the HARQ control by applying the retransmission control mode selected by the base station side.

In addition, in this embodiment, pros and cons of applying the low latency mode can be determined by referring to a management table 103, for example, based on existence of an unused interlace to which the low latency mode is allowed to be applied. As is clear from the relation between interlace number 0 and interlace number 4 in FIG. 4, when the low latency mode is applied, one mobile station will exclusively use frames composed of two interlaces to transmit and receive data. Therefore, it may be all right that a threshold indicating an upper limit for the number of interlaces for which the low latency mode is allowed to be applied is set in advance, and the HARQ control of the low latency mode within the limit of the threshold is performed. Moreover, in the case where an unused interlace is more than or equal to a previously determined value, the low latency mode may be allowed.

As is clear from the above embodiments, according to the present invention, since in the radio cellular communication, the system is configured to be able to selectively perform the retransmission control of the low latency mode in addition to the retransmission control of the normal mode by shortening the HARQ transmission interval as necessary, data transfer with a smaller transmission delay can be realized according to the kind of a service.

What is claimed is:

1. A radio communication system that transmits and receives packets according to a hybrid automatic repeat request (HARQ) method between a base station and a plurality of radio mobile stations, the base station and each of the radio mobile stations comprising:

an RF transmission/reception circuit;
a packet transmission circuit that divides an original packet including parity bits into a plurality of subpackets and outputs each of the subpackets to the RF transmission/reception circuit at a predetermined interval;
a packet reception circuit for, when receiving one of the subpackets from the RF transmission/reception circuit, repeating decoding processing by combining the received one of the subpackets and a previously received subpacket until the original packet is successfully decoded; and
a controller that generates an ACK response, when the original packet is successfully decoded by the packet reception circuit, as a response to the received one subpacket, and generates a NAK response, when the original packet is unsuccessfully decoded, as the response to the received one subpacket, and sends back the ACK or NAK response through the packet transmission circuit at a predetermined timing,
wherein, if a size of a subpacket corresponding to the original packet is not shorter than a predetermined size, the controller performs HARQ control such that a transmission of subpackets related to the original packet or responses to transmitted subpackets are transmitted in a normal transmission mode with a first fixed time interval between transmissions related to the original packet,
wherein, if a size of a subpacket corresponding to the original packet is shorter than a predetermined size the controller performs HARQ control such that a transmission of subpackets related to the original packet or responses to transmitted subpackets are transmitted in a shortened transmission mode with a second fixed time interval between transmissions related to the original, packet, wherein the second fixed time interval is less than the first fixed time interval,
wherein the packet transmission circuit comprises an OFDM (Orthogonal Frequency Division Multiplexing) type transmission circuit where a channel for subpacket transmission and a channel for transmitting the response are formed with a subcarrier group whose subcarriers have different wavelengths, wherein the packet reception circuit comprises an OFDM type reception circuit, and
wherein the controller has a management table for storing HARQ control mode information for specifying a HARQ transmission interval so as to be associated with an interlace ID (identification number) indicating a relation between a time frame for subpacket transmission and a time frame for response transmission, and controls the HARQ transmission interval of the shortened transmission mode according to the interlace corresponding to the interlace ID of the management table.

2. The radio communication system according to claim 1, wherein the controller of the radio mobile station sends back a response to data transmission in the shortened transmission mode by applying a response identification number that is not used in data transmission of the normal transmission mode in a channel group for response transmission to the base station from the radio mobile station.

3. The radio communication system according to claim 1, wherein the controller of the radio mobile station sends back a response to data transmission in the shortened transmission mode using a channel that is kept unused for interference estimation in data transmission of the normal transmission mode among channels of a channel group for response transmission to the base station from the radio mobile station.

4. The radio communication system according to claim 1, wherein the controller of the radio mobile station sends back a response to data transmission of the normal transmission mode and a response to data transmission in the shortened transmission mode by performing orthogonal multiplexing on them in one channel among channels of a channel group for response transmission to the base station from the radio mobile station.

5. The radio communication system according to claim 1, wherein the controller of the radio mobile station sends back a response to data transmission of the normal transmission mode and a response to data transmission in the shortened transmission mode by performing orthogonal multiplexing on the responses in one channel among channels of a channel group for response transmission to any one of the radio mobile stations from the base station.

6. The radio communication system according to claim 1, wherein a resource assignment message for a reverse direction data channel that the base station issues in response to a resource assignment request from any one of the radio mobile stations or a resource assignment message for a forward direction data channel issued at the time of transmitting the first subpacket to any one of the radio mobile stations includes information indicating whether the HARQ transmission interval is the normal transmission mode or the shortened transmission mode.

7. A radio mobile station that transmits and receives a packet between itself and a base station by a hybrid automatic repeat request (HARQ) method, comprising:
an RF transmission/reception circuit;
a packet transmission circuit that divides an original packet including parity bits into a plurality of subpackets and outputs each of the packets to the RF transmission/reception circuit at a predetermined interval;
a packet reception circuit that, when receiving one of the subpackets from the RF transmission/reception circuit, repeats decoding processing by combining the received one of the subpackets and an previously received subpacket until an original packet is successfully decoded; and
a controller that generates an ACK response if the original packet is successfully decoded by the reception circuit as a response to the received subpacket, and generates a NAK response if the original packet unsuccessfully decoded,
wherein, if a size of a subpacket corresponding to the original packet is not shorter than a predetermined size, the controller performs HARQ control such that a transmission of subpackets related to the original packet or responses to transmitted subpackets are transmitted in a normal transmission mode with a first fixed time interval between transmissions related to the original packet,
wherein, if a size of a subpacket corresponding to the original packet is shorter than a predetermined size the controller performs HARQ control such that a transmission of subpackets related to the original packet or responses to transmitted subpackets are transmitted in a shortened transmission mode with a second fixed time interval between transmissions related to the original packet, wherein the second fixed time interval is less than the first fixed time interval,
wherein the packet transmission circuit comprises an OFDM (Orthogonal Frequency Division Multiplexing) type transmission circuit where a channel for subpacket transmission and a channel for transmitting the response are formed with a subcarrier group whose subcarriers have different wavelengths,
wherein the packet reception circuit comprises an OFDM type reception circuit and
wherein the controller has a management table for storing HARQ control mode information for specifying the HARQ transmission interval so as to be associated with an interlace ID (identification number) indicating a relation between a time frame for subpacket transmission and a time frame for response transmission, and controls the HARQ transmission interval of the shortened transmission mode according to the interlace corresponding to the interlace ID of the management table.

8. The radio mobile station according to claim 7, wherein the controller sends back a response to data transmission in the shortened transmission mode by applying a response identification number that is not used in the data transmission of the normal transmission mode in the channel group for response transmission to the base station from the radio mobile station.

9. The radio mobile station according to claim 7, wherein the controller sends back a response to data transmission in the shortened transmission mode using a channel that is in kept unused for interference estimation in data transmission of the normal transmission mode among channels of a channel group for response transmission to the base station from the radio mobile station.

10. The radio mobile station according to claim 7, wherein the controller transmits a response to data transmission of the normal transmission mode and a response to data transmission in the shortened transmission mode by performing orthogonal multiplexing on the responses in one channel among channels of a channel group for response transmission to the base station from the radio mobile station.

11. A radio base station that transmits and receives packets to and from multiple radio mobile stations according to a hybrid automatic repeat request (HARQ) method, comprising:
an RF transmission/reception circuit;
a packet transmission circuit that divides an original packet including parity bits into a plurality of subpackets and outputs each of the subpackets to the RF transmission/reception circuit in a predetermined interval;
a packet reception circuit for, when receiving one of the subpackets from the RF transmission/reception circuit, repeating decoding processing by combining the received one of the subpackets and a previously received subpacket until the original packet is successfully decoded; and
a controller that, if the original packet is successfully decoded by the packet reception circuit, generates an ACK as a response, and if is the original packet is unsuccessfully decoded, generates a NAK as the response and sends back the response through the packet transmission circuit at a predetermined timing,
wherein, if a size of a subpacket corresponding to the original packet is not shorter than a predetermined size, the controller performs HARQ control such that a transmission of subpackets related to the original packet or responses to transmitted subpackets are transmitted in a normal transmission mode with a first fixed time interval between transmissions related to the original packet,
wherein, if a size of a subpacket corresponding to the original packet is shorter than a predetermined size the controller performs HARQ control such that a transmission of subpackets related to the original packet or responses to transmitted subpackets are transmitted in a shortened transmission mode with a second fixed time interval between transmissions related to the original packet, wherein the second fixed time interval is less than the first fixed time interval,
wherein the packet transmission circuit comprises an OFDM (Orthogonal Frequency Division Multiplexing) type transmission circuit where a channel for subpacket transmission and a channel for transmitting the response are formed with a subcarrier group whose subcarriers have different wavelengths,
wherein the packet reception circuit comprises an OFDM type reception circuit and
wherein the controller has a management table for storing HARQ control mode information for specifying the HARQ transmission interval so as to be associated with an interlace ID (identification number) indicating a relation between a time frame for subpacket transmission and a time frame for response transmission and controls the HARQ transmission interval of the shortened transmission mode according to the interlace corresponding to the interlace ID of the management table.

12. The radio communication system according to claim 11,
wherein, when receiving a response having a response identification number that is not used in data transmission of the normal transmission mode in channels of a channel group for response transmission from the respective radio mobile stations, the controller determines that the response is a response to data transmission in the shortened transmission mode.

13. The radio base station according to claim 11,
wherein, when receiving an response in a channel that is in kept unused for interference estimation in data transmission of the normal transmission mode among channels of a channel group for response transmission from the respective radio mobile stations, the controller determines that the response is a response to data transmission in the shortened transmission mode.

14. The radio base station according to claim 11,
wherein the HARQ control transmits a response to data transmission of the normal transmission mode and a response to data transmission in the shortened transmission mode by performing orthogonal multiplexing on them to one channel among channels in a channel group for response transmission heading for each radio mobile station.

* * * * *